United States Patent
Tonse et al.

(10) Patent No.: US 7,809,605 B2
(45) Date of Patent: *Oct. 5, 2010

(54) ALTERING KEYWORD-BASED REQUESTS FOR CONTENT

(75) Inventors: Sudhir Tonse, Fremont, CA (US); Muhammad Mohsin Hussain, San Jose, CA (US); David C. Sobotka, Redwood City, CA (US); Aftab Zia, Santa Clara, CA (US); Leejay Wu, Mountain View, CA (US); M. Sultan Khan, San Jose, CA (US); Brock D. LaPorte, San Carlos, CA (US); Mohan S. Rao, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 1096 days.

This patent is subject to a terminal disclaimer.

(21) Appl. No.: 11/391,019

(22) Filed: Mar. 28, 2006

(65) Prior Publication Data

US 2007/0150345 A1 Jun. 28, 2007

Related U.S. Application Data

(60) Provisional application No. 60/753,254, filed on Dec. 22, 2005, provisional application No. 60/753,253, filed on Dec. 22, 2005.

(51) Int. Cl.
*G06Q 30/00* (2006.01)
(52) U.S. Cl. ............... 705/14.54; 705/14.4; 705/14.43; 705/14.42; 705/10
(58) Field of Classification Search ............. 705/14.54, 705/14.4, 14.43, 14.42, 10
See application file for complete search history.

(56) References Cited

U.S. PATENT DOCUMENTS

| | | | |
|---|---|---|---|
| 5,717,923 A | 2/1998 | Dedrick | |
| 5,796,952 A | 8/1998 | Davis et al. | |
| 5,918,014 A | 6/1999 | Robinson | |
| 5,948,061 A | 9/1999 | Merriman et al. | |
| 6,014,638 A | 1/2000 | Burge et al. | |
| 6,047,310 A | 4/2000 | Kamakura et al. | |
| 6,108,637 A | 8/2000 | Blumenau | |
| 6,144,944 A | 11/2000 | Kurtzman, II et al. | |
| 6,285,987 B1 | 9/2001 | Roth et al. | |
| 6,334,110 B1 | 12/2001 | Walter et al. | |
| 6,421,706 B1 | 7/2002 | McNeill et al. | |
| 6,516,312 B1 | 2/2003 | Kraft et al. | |
| 6,959,339 B1 | 10/2005 | Wu et al. | |

(Continued)

OTHER PUBLICATIONS

U.S. Appl. No. 11/390,713, filed Mar. 28, 2006, Law et al.

(Continued)

*Primary Examiner*—Michael Bekerman
*Assistant Examiner*—Luis Brown
(74) *Attorney, Agent, or Firm*—Workman Nydegger

(57) ABSTRACT

Systems and methods are provided for increasing user response to advertisements. Methods include identifying a base request from an advertisement requester, identifying a first keyword and a second keyword associated with the base request, ranking the first keyword and the second keyword based on a user response history associated with the first keyword and the second keyword, and identifying the higher ranked of the first keyword and the second keyword to be used to dynamically alter the base request.

17 Claims, 15 Drawing Sheets

U.S. PATENT DOCUMENTS

| | | |
|---|---|---|
| 7,035,923 B1 | 4/2006 | Yoakum |
| 7,039,599 B2 | 5/2006 | Merriman et al. |
| 7,072,984 B1 | 7/2006 | Polonsky et al. |
| 7,155,508 B2 | 12/2006 | Sankuratripati et al. |
| 7,200,590 B2 | 4/2007 | Everett-Church et al. |
| 7,353,267 B1 | 4/2008 | Cunningham et al. |
| 7,440,968 B1 | 10/2008 | Oztekin et al. |
| 2001/0036182 A1 | 11/2001 | Addante |
| 2001/0054001 A1 | 12/2001 | Robinson |
| 2002/0004733 A1 | 1/2002 | Addante |
| 2002/0046099 A1 | 4/2002 | Frengut et al. |
| 2002/0072984 A1 | 6/2002 | Rothman et al. |
| 2002/0099600 A1 | 7/2002 | Merriman et al. |
| 2003/0009385 A1 | 1/2003 | Tuciarone et al. |
| 2003/0115187 A1 | 6/2003 | Bode et al. |
| 2004/0123247 A1 | 6/2004 | Wachen et al. |
| 2004/0186766 A1 | 9/2004 | Fellenstein |
| 2005/0091106 A1* | 4/2005 | Reller et al. ............... 705/14 |
| 2005/0149395 A1* | 7/2005 | Henkin et al. ............. 705/14 |
| 2005/0149499 A1 | 7/2005 | Franz et al. |
| 2005/0154718 A1 | 7/2005 | Payne et al. |
| 2005/0187950 A1 | 8/2005 | Parker et al. |
| 2005/0223000 A1 | 10/2005 | Davis et al. |
| 2005/0240580 A1 | 10/2005 | Zamir et al. |
| 2006/0026147 A1* | 2/2006 | Cone et al. ................. 707/3 |
| 2006/0080321 A1 | 4/2006 | Horn et al. |
| 2006/0136294 A1 | 6/2006 | Linden et al. |
| 2006/0242139 A1 | 10/2006 | Butterfield et al. |
| 2006/0242178 A1 | 10/2006 | Butterfield et al. |
| 2006/0287980 A1 | 12/2006 | Liu et al. |
| 2007/0083639 A1 | 4/2007 | Gilbert et al. |
| 2007/0150347 A1 | 6/2007 | Bhamidipati et al. |
| 2007/0208751 A1 | 9/2007 | Cowan et al. |
| 2007/0214132 A1 | 9/2007 | Grubb et al. |
| 2007/0271340 A1 | 11/2007 | Goodman et al. |
| 2008/0109406 A1 | 5/2008 | Krishnasamy et al. |

OTHER PUBLICATIONS

U.S. Appl. No. 11/391,088, filed Mar. 28, 2006, Bhamidipati et al.
U.S. Appl. No. 11/390,651, filed Mar. 28, 2006, Zia et al.
U.S. Appl. No. 11/391,086, filed Mar. 28, 2006, Sobotka et al.
U.S. Appl. No. 11/390,868, filed Mar. 28, 2006, Sobotka et al.
U.S. Appl. No. 11/423,350, filed Jun. 9, 2006, Sobotka et al.
U.S. Appl. No. 11/390,766, filed Mar. 28, 2006, Kannapell et al.
U.S. Appl. No. 11/394,252, filed Mar. 30, 2006, Hussain et al.
"Powerseek PPC Plug-In Manual," Author Unknown, Nov. 19, 2004 [online] [retrieved on Dec. 6, 2006]. 4 pgs. Retrieved from the Internet: http://web.archive.org/web/20041119021954/http://www.focalmedia.net/ppc_manual/4_ppc.html.
"Microsoft to Announce AdWords Competitor," by Chris Richardson, Mar. 15, 2005, [online] [retrieved on Oct. 18, 2006], 4 pgs. Retrieved from the Internet: http://www.webpronews.com/printable.php.
"New Ask Jeeves Sponsored Listings Program Lets More Advertisers Buy Direct," by Danny Sullivan, Aug. 1, 2005, [online] [retrieved on Oct. 18, 2006], 3 pgs. Retrieved from the Internet: http://searchenginewatch.com/showPage.html?page=sew_print&id=3524141.
"Ask Jeeves' Sponsored Listings Portends Fragmentation of Search Marketing," by Charlene Li, Aug. 2, 2005, [online] [retrieved on Oct. 18, 2006], 4 pgs. Retrieved from the Internet: http://blogs.forrester.com/charleneli/2005/08/ask_jeeves_spon.html.
"Allfeeds Google Backfill," Author Unknown, Aug. 24, 2005 [online] [retrieved on Oct. 18, 2006], 2 pg. Retrieved from the Internet: http://www.theadminzone.com/forums/printthread.php?t=13512.
"A Nifty Personalized News Site," by JD Lasica, Jan. 14, 2004, [online] [retrieved on Nov. 27, 2006], 10 pgs. Retrieved from the Internet: http://www.newmediamusings.com/blog/2004/01/a_nifty_persona.html.

Home page for Findory.com, Nov. 2, 2004 [online] [retrieved on Dec. 6, 2006], 2 pgs. Retrieved from the Internet: http://web.archive.org/web/20041102024941/http://findory.com/.
"About Findory", Nov. 2, 2004 [online] [retrieved on Dec. 6, 2006], 1 pg. Retrieved from the Internet: http;//web.archive.org/web/20041125040039/findory.com/company/.
"Unintrusive Customization Techniques for Web Advertising," by Marc Langheinrich, Atsuyoshi Nakamura, Naoki Abe, Tomonari Kamba, Yoshiyuki Koseki, Amsterdam, Netherlands, 1999, [online] [retrieved on Oct. 12, 2006], 19 pgs. Retrieved from the Internet: http://www.vs.inf.ethz.ch/publ/papers/www8-adwiz/.
Bibliography for "Unintrusive Customization Techniques for Web Advertising," by Marc Langheinrich, Atsuyoshi Nakamura, Naoki Abe, Tomonari Kamba, Yoshiyuki Koseki, as found on http://citeseer.ist.psu.edu/366379.html [online] [retrieved on Oct. 12, 2006], 2 pgs.
"Multi-Service Search and Comparison Using the MetaCrawler," by Erik Selberg and Oren Etzioni, © 1993, 1994, Nikos Drakos, Computer Based Learning Unit, University of Leeds, translation initiated by Erik Selberg on Oct. 9, 1995, [online] [retrieved on Oct. 12, 2006], 16 pgs. Retrieved from the Internet: http://www.w3.org/Conferences/WWW4/Papers/169/.
Bibliography for "Multi-Service Search and Comparison Using the MetaCrawler," by Erik Selberg and Oren Etzioni, © 1993, 1994, Nikos Drakos, Computer Based Learning Unit, University of Leeds, as found on http://citeseer.ist.psu.edu/selberg95multiservice.html [online] [retrieved on Dec. 6, 2006], 2 pgs.
"Optimizing Search by Showing Results in Context," by Susan Dumais, Edward Cutrell, and Hao Chen, © 2001, published in *SIGCHI*'01, Mar. 31-Apr. 4, 2001, 8 pgs.
Bibliography for "Opimizing Search by Showing Results in Context," by Susan Dumais, Edward Cutrell, and Hao Chen, © 2001, as found on http://citeseer.ist.psu.edu/dumais01optimizing.html [online] [retrieved on Dec. 6, 2006], 1 pg.
"New Site Layout Influences Results for Bankrate.com," by7 Mickey Alam Khan, Jul. 12, 2004, [online] [retrieved on Nov. 27, 2006], 2 pgs. Retrieved from the Internet: http://www.optimost.com/press/071204.phtml.
"Designing Web Ads Using Click-Through Data," by Jakob Nielsen, Sep. 2, 2001, [online] [retrieved on Oct. 12, 2006], 3 pgs. Retrieved from the Internet: http://www.useit.com/alertbox/20010902.html.
"The Science of Targeting," by Dawn Anfuso, Mar. 18, 2004, [online] [retrieved on Oct. 12, 2006], 3 pgs. Retrieved from the Internet: http://www.imediaconnection.com/global/5728.asp?ref=http://www.imediaconnection.com/content/3045.asp.
"Study Shows Target Demographics Important in Search Engine Marketing Campaigns," Author Unknown, May 18, 2004, [online] [retrieved on Oct. 12, 2006], 3 pgs. Retrieved from the Internet: http://www.searchenginejournal.com/?p=582.
"Optimizing Paid Search Advertising," by Kevin Gold, Nov. 9, 2004, [online] [retrieved on Oct. 12, 2006], 2 pgs. Retrieved from the Internet: http://content.websitegear.com/article/print.asp?id=ppc_effectiveness.
"Search advertising glossary of terms," Author Unknown, Aug. 6, 2004, [online] [retrieved on Oct. 12, 2006], 6 pgs. Retrieved from the Internet: http://web.archive.org/web/20040806065852/http://www.google.com/ads/glossary.html.
"MSN adCenter Joins Yahoo and Google in Search Advertising," by Greg Sterling, Mar. 17, 2005, [online] [retrieved on Oct. 12, 2006], 3 pgs. Retrieved from the Internet: http://www.searchenginejournal.com/?p=1438.
"The Decade in Online Advertising 1994-2004," by Rick E. Bruner, Apr. 2005, DoubleClick, Inc., 11 pgs. [www.doubleclick.com].
"Target Demographics, Before and After," by Rick E. Bruner and Kathryn Koegel, Jun. 2005, DoubleClick, Inc., 9 pgs. [www.doubleclick.com].
"Search Engine Strategies 2005 Conference & Expo Agenda Monday, Dec. 5, 2005," Author Unknown, Oct. 28, 2005, [online] [retrieved on Dec. 6, 2006], 5 pgs. Retrieved from the Internet: http://web.archive.org/web/20051028030050/www.jupitoerevents.com/sew/fall05/agenda1.html.
"Search Engine Strategies 2005 Conference & Expo Agenda Tuesday, Dec. 6, 2005," Author Unknown, Oct. 28, 2005, [online]

[retrieved on Dec. 6, 2006], 4 pgs. Retrieved from the Internet: http://web.archive.org/web/20051028030050/www.jupiterevents.com/sew/fall05/agenda2.html.

"Search Engine Strategies 2005 Conference & Expo Agenda Wednesday, Dec. 7, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda3.html.

"Search Engine Strategies 2005 Conference & Expo Agenda Thursday, Dec. 8, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda4.html.

*Internet Archive, Frequently Asked Questions*; http://www.archive.org/about/faqs.php; Dec. 6, 2006; 46 pages.

*About Citeseer*; http://citeseer.ist.psu.edu/citeseer.html; Dec. 6, 2006; 2 pages.

U.S. Appl. No. 11/423,350, filed Oct. 16, 2007, Office Action.
U.S. Appl. No. 11/423,350, filed May 2, 2008, Final Office Action.
U.S. Appl. No. 11/423,350, filed Nov. 13, 2008, Office Action.
U.S. Appl. No. 11/423,350, filed Jul. 21, 2009, Final Office Action.
U.S. Appl. No. 11/391,086, filed Aug. 17, 2009, Office Action.
U.S. Appl. No. 11/390,766, filed Aug. 31, 2009, Office Action.
U.S. Appl. No. 11/390,713, filed Sep. 3, 2009, Office Action.
U.S. Appl. No. 11/391,088, filed Oct. 1, 2009, Office Action.
U.S. Appl. No. 11/390,651, filed Oct. 1, 2009, Office Action.
U.S. Appl. No. 11/394,252, filed Oct. 2, 2009, Office Action.

"Advertise your business on Google," Author Unknown, Date Unknown, [online] [retrieved on Oct. 18, 2006], 4 pgs. Retrieved from the Internet: https://adwords.google.com/select/Login.

"Keyword Tool," Author Unknown [online] [retrieved on Oct. 24, 2006], 1 pg. Retrieved from the Internet: https://adwords.google.com/select/KeywordToolExternal?defaultView=2.

"Should Yahoo Own Social Search and Rank in a Web 2.0 World?" by Thomas Hawk, Oct. 30, 2006, [online] [retrieved on Nov. 1, 2006], 2 pgs. Retrieved from the Internet: http://www.searchnewz.com/blog/talk/sn-6-20061030ShouldYahooOwnSocialSearchandRankinaWeb20World.html.

"Top 10 Search Results Guarantee," Author Unknown, Date Unknown, [online] [retrieved on Oct. 11, 2006], 2 pgs. Retrieved from the Internet: http://www.networksolutions.com/web-site-promotion/popup-search-engine-optimization-guarantee.jsp.

"Targeting Search Ads by Demographics & Behavior," Author Unknown, Feb. 27, 2006, [online] [retrieved on Nov. 28, 2006], 5 pgs. Retrieved from the Internet: http://www.seroundtable.com/archives/003379.html.

"Targeting Search Ads by Demographics & Behavior," by Greg Jarboe, Mar. 22, 2006, [online] [retrieved on Oct. 12, 2006], 3 pgs. Retrieved from the Internet: http://searchenginewatch.com/showPage.html?page=sew_print&id =3593236.

"Best Practices for Optimizing Web Advertising Effectiveness," by Rick E. Bruner, May 2006, DoubleClick, Inc., 14 pgs. [www.doubleclick.com].

"The Promise of Behavioral Targeting," by Bruce Clay, Aug. 24, 2006, [online] [retrieved on Oct. 12, 2006], 3 pgs. Retrieved from the Internet: http://www.searchengineguide.com/cgi-bin/mtview.cgi/75/entry/8277/print_version.

"Microsoft® adCenter Labs presentation," Author Unknown, Jun. 11, 2006, [online] [retrieved on Dec. 6, 2006], 2 pgs. Retrieved from the Internet: http://web.archive.org/web/20060601184523/http://adlab.msn.com/demo.aspx.

"The Web Bug FAQ," by Richard M. Smith, Nov. 11, 1999 [online] [retrieved on Oct. 18, 2006], 4 pgs. Retrieved from the Internet: http://www.eff.org/Privacy/Marketing/web_bug.html.

"Software to Track E-Mail Raises Privacy Concerns," by Amy Harmon, Nov. 22, 20002 [online] [retrieved on Oct. 18, 2006], 9 pgs. Retrieved from the Internet: http://www.nytimes.com/2000/11/22/technology/22NET.html?ex=1165457600&en=fd45f4346250d53f&ei=5070, http://www.nytimes.com/2000/11/22/technology/22NET.html?pagewanted=2&ei=5070&en=fd45f4346250d53f&ex=1165467600, and http://www.nytimes.com/2000/11/22/technology/22NET.html?pagewanted=3&ei=5070&en=fd45f4346250d53f&ex=1165467600.

Technology Talk—Capturing Implied Response, a.k.a. "Link Tracking," Author Unknown, May 2001 [online] [retrieved on Oct. 18, 2006], 2 pgs. Retrieved from the Internet: http://web.archive.org/web/20010702062409/http://www.netline.com/newsletter/h/techtalk05_01.html.

"The Hunt for Stats Tracking Email and Clear Pixels," by Keith Boswell, The Marketleap Report vol. II, Issue #14—Part 2, Aug. 21, 2002 [online] [retrieved on Nov. 27, 2006], 4 pgs. Retrieved from the Internet: http://www.marketleap.com/report/ml_report_34.htm.

"More on Email Privacy," by Preston Gralla, Jun. 8, 2004 [online] [retrieved on Oct. 18, 2006], 3 pgs. Retrieved from the Internet: http://www.oreillynet.com/windows/blog/2004/06/more_on_email_privacy.html.

"Web Buggery: Analyzing Tracking Images," Author Unknown, Dec. 7, 2004 [online] [retrieved on Dec. 6, 2006], 7 pgs. Retrieved from the Internet: http://web.archive.org/web/20041207215656/irongeek.com/i.php?page=security/webbugs.

Windows 2000 server as a router, Specialty Forums on Computing.net, question on how to set up a Windows 2000 Server as a router submitted Jul. 8, 2002 with instructions to do so in responses submitted Jul. 9, 2002. Retrieved from http://www.computing.net answers/networking/windows-2000-server-as-arouter/7827.html.

U.S. Appl. No. 11/391,088, filed Apr. 27, 2010, Final Office Action.
U.S. Appl. No. 11/390,651, filed Apr. 28, 2010, Final Office Action.
U.S. Appl. No. 11/390,713, filed Mar. 16, 2010, Final Office Action.
U.S. Appl. No. 11/390,868, filed Oct. 15, 2009, Office Action.
U.S. Appl. No. 11/391,086, filed Feb. 3, 2010, Final Office Action.
U.S. Appl. No. 11/423,350, filed Feb. 3, 2010, Office Action.
U.S. Appl. No. 11/390,766, filed Feb. 3, 2010, Final Office Action.

* cited by examiner

| Total Words: 44 | | |
|---|---|---|
| Occurrences: 143 | | |
| Count | Word | Density |
| 12 | india | 8.39% |
| 9 | cricket | 6.29% |
| 8 | rediff | 5.59% |
| 7 | rankings | 4.9% |
| 6 | pakistan | 4.2% |
| 5 | coach | 3.5% |
| 5 | ganguly | 3.5% |
| 5 | west | 3.5% |
| 4 | australia | 2.8% |
| 4 | captain | 2.8% |
| 4 | indies | 2.8% |

| 2 Word Phrases: 10 | | |
|---|---|---|
| Occurrences: 24 | | |
| Count | Word | Density |
| 4 | rediff rankings | 16.67% |
| 4 | west indies | 16.67% |
| 2 | india captian | 8.33% |
| 2 | john wright | 8.33% |
| 2 | panic station | 8.33% |
| 2 | rankings rankings | 8.33% |
| 2 | rediff cricket | 8.33% |
| 2 | sourav ganguly | 8.33% |
| 2 | south africa | 8.33% |
| 2 | tour pakistan | 8.33% |

| 3 Word Phrases: 1 | | |
|---|---|---|
| Occurrences: 2 | | |
| Count | Word | Density |
| 2 | rediff rankings rankings | 100% |

*FIG. 2B*

Top searches by category

Top 10 - January 23
1. Anna Benson
2. Seattle Seahawks
3. Pittsburgh Steelers
4. Super Bowl
5. Pilates
6. Desperate...
7. NFL
8. Super Bowl Tickets
9. Celebrity Fit...
10. Miss America 2006

Entertainment and Celebs
1. Dancing With the Stars
2. hgtv.com
3. qvc
4. Martha Stewart
5. lyrics
6. Oprah
7. disneychannel
8. CNN
9. Smallville
10. Food Network

Movies
1. Imdb
2. Go
3. Monster
4. XXX
5. brokeback mountain
6. high school musical
7. Love
8. O
9. bingo
10. Swingers

Music
1. lyrics
2. ABC
3. song lyrics
4. names
5. FORD
6. guitar tabs
7. music
8. chris brown
9. Hotwire
10. Love

Sports
1. WWE
2. australian open
3. nascar
4. chris brown
5. superbowl
6. nba
7. nba.com
8. Super Bowl
9. Pittsburgh Steelers
10. NFL

Television
1. Dancing With the Stars
2. hgtv.com
3. qvc
4. Disney Channel
5. CNN
6. Smallville
7. abc.com
8. foodnetwork
9. E!
10. espn

Games
1. powerball
2. FOO
3. pogo
4. singo
5. kittery
6. games
7. runescape
8. pogo games
9. florida lotery
10. American Idol

*FIG. 2C*

DMN Reporting System - BUSINESS LOGS

Report Date: 2006/01/29

Report Type:

Channels
    Channels View
Queries
    Total Requests
Impressions
    Supplier & Rank
    Channels & Rank
Click Thru Rate
    Supplier
    Supplier & Rank
Top KW byChannel
    Top 10 Q Impressions
    Top 10 Q Clicks
Performance
    Supp. Response Time
    Supp. Capacity Coverage
    Query Timing Out
    Query Yield No Results
    Supp. Ret. at least 1 Ad
Filter
    KW Blocked Outgoing
    KW Blocked Incoming
    URL Blocked Incoming Welcome to DMN

KW/Queries with most Clicks
2006-01-29

| Channel | Sub-Channel | KW/Query | Total Clicks |
|---|---|---|---|
| aol-landing | | yahoo.com | 316 |
| aol-landing | | www.yahoo.com | 208 |
| aol-landing | | ebay | 156 |
| aol-landing | | buick.com | 120 |
| aol-landing | | http://www.bloodypenguins toss game | 96 |
| aol-landing | | map of the united states | 84 |
| aol-landing | | www.ebay.com | 84 |
| aol-landing | | eight chair round tables | 80 |
| aol-landing | | ebay.com | 72 |
| aol-landing | | mitsubishi oxford.nc | 64 |
| aol-landing | campaign10 | listen to music | 1448 |
| aol-landing | campaign10 | search for inmate | 1300 |
| aol-landing | campaign10 | newspaper obituaries | 840 |
| aol-landing | campaign10 | cheap airfare | 812 |
| aol-landing | campaign10 | find people in prison | 500 |
| aol-landing | campaign10 | hospital listings | 496 |

*FIG. 2D*

| keywords | source | low range bid | high range bid | bidprice |
|---|---|---|---|---|
| realty | Supplier B | .25 | .35 | |
| homes | Supplier A | | | .24 |
| loan | Supplier C | | | .55 |
| flowers | Supplier A | 0.15 | 1.20 | |
| cars | Supplier C | | | 0.15 |

FIG. 2E

ALTERING KEYWORD-BASED REQUESTS FOR CONTENT

CROSS-REFERENCE TO RELATED APPLICATIONS

This application claims priority to U.S. Provisional Patent Application Ser. No. 60/753,254, filed Dec. 22, 2005 and U.S. Provisional Patent Application Ser. No. 60/753,253, filed Dec. 22, 2005, which applications are incorporated by reference herein in their entireties.

BACKGROUND OF THE INVENTION

1. The Field of the Invention

The present invention relates to systems and methods for optimizing advertising. More particularly, the present invention relates to systems and methods for altering requests intended to increase user response to the advertisements.

2. The Relevant Technology

Many search engines provide sponsored advertisement links that correspond to search criteria. Sponsored advertisement links are selected based on matching keywords for the advertisement link with keywords in the search. The priority of how sponsored links are ultimately displayed is generally given to the sponsor that has the highest bid fee. However, displaying sponsored links strictly on a keyword matching basis does not always provide the most enticing sponsored advertisement links. Therefore, it would be beneficial to present the most optimized advertisement links to content viewers.

BRIEF SUMMARY OF THE INVENTION

In one embodiment, the present invention includes, in a computer system, a method for increasing user response to advertisements from advertisement suppliers obtained in response to keywords, the method including identifying a base request from an advertisement requester; identifying a first keyword and a second keyword associated with the base request; ranking the first keyword and the second keyword based on a user response history associated with the first keyword and the second keyword; and identifying the higher ranked of the first keyword and the second keyword to be used to dynamically alter the base request.

In another embodiment, the present invention includes, in a computer system, a method for increasing user response to advertisements from advertisement suppliers obtained in response to keywords, the method including identifying a base request from an advertisement requester; identifying a first keyword and a second keyword associated with the base request; ranking the first keyword and the second keyword based on a user response history for each keyword; dynamically altering the base request to include the higher ranked of the first keyword and the second keyword to form an altered request; sending the altered request to an advertisement supplier; receiving at least one advertisement from the advertisement supplier in response to the altered request; sending the at least one advertisement to the advertisement requester; and tracking user response to the at least one advertisement.

In yet another embodiment, the present invention includes a system configured to increase user response to advertisements from advertisement suppliers obtained in response to keywords, the system including an optimization engine configured to identify a base request from an advertisement requester; identify a first keyword and a second keyword associated with the base request; identify a user response history associated with the first keyword and the second keyword; and rank the first keyword and the second keyword based on the user response history; and a routing system communicating with an advertisement requester and an advertisement supplier, the routing system also communicating with the optimization engine, the routing system configured to dynamically alter the base request to include the higher ranked of the first keyword and the second keyword to form an altered request; and send the altered request to an advertisement supplier.

These and other embodiments of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2B illustrates an example of a ranking and density listing according to aspects of one embodiment of the present invention.

FIG. 2C illustrates an example of a hot topics and topics by category according to aspects of one embodiment of the present invention.

FIG. 2D illustrates an example of a report showing the click through rates for various keywords according to aspects of one embodiment of the present invention.

FIG. 2E illustrates an example of a bid fee table according to aspects of one embodiment of the present invention.

DETAILED DESCRIPTION OF VARIOUS EMBODIMENTS

Figure 1:
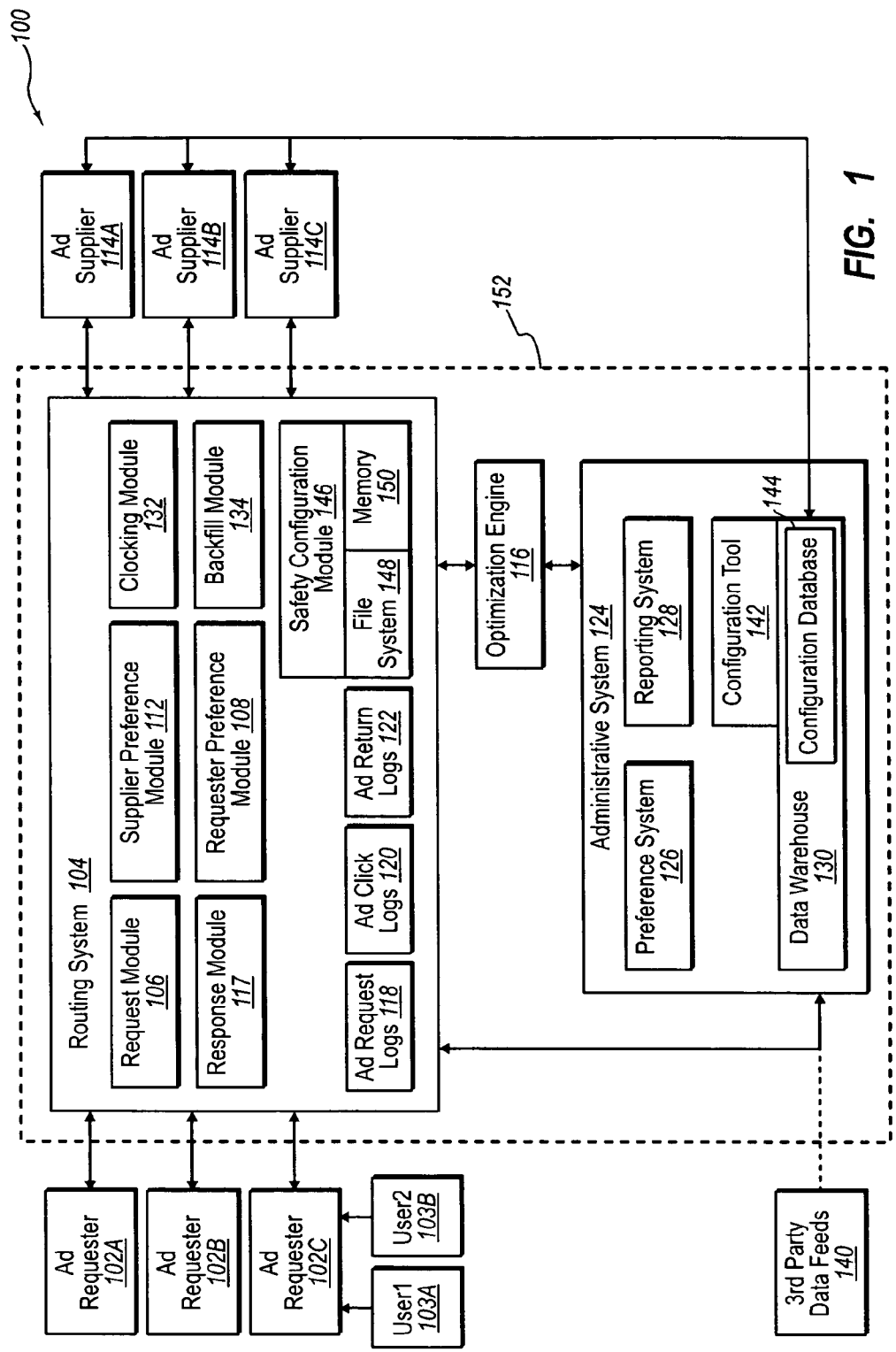
FIG. 1 illustrates an exemplary system diagram according to aspects of one embodiment of the present invention.

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention. The present invention extends to methods, systems, computer program products, and data structures for efficiently optimizing display of electronic advertisements in search engines or other user interfaces which desire to provide effective advertisements. The embodiments of the present invention may include one or more special purpose or general-purpose computers, as discussed in greater detail below.

Embodiments of the present invention generally provide for displaying electronic advertisements in the most profitable manner possible from a set of marketplaces or suppliers. A "supplier" can be defined as any provider of electronic advertisements. Some examples of suppliers are advertisement services such as, but not limited to, AOL, Google, Ingenio, Overture, and ad.com. However, suppliers may also come directly from the merchant. Thus, an "advertisement" is any electronic advertisement provided by a supplier. The advertisement can be in the form of text or graphics provided by a supplier that are subsequently presented on a user interface. The user can select the text or graphic (i.e., link) to view an advertisement which can be in the form of, but not limited to, a sponsored link, a video clip, an audio stream clip, a pay per call ad, and the like. The revenue base for advertisements can be any negotiated basis, such as pay-per-call (e.g., Ingenio) or pay-per-click (e.g., Google). For example, when an advertisement is acted upon by a user (e.g., click-through), the advertisement merchant pays the supplier a certain fee for presenting the advertisement to the user.

A "requester" is any source that is making a request for advertisements. For example, a source may be any user interface (e.g., a web page), web content servers, email servers, instant messaging servers, RSS servers, alerts servers, poll servers, and the like. Thus, in some embodiments, a requester and a supplier may be the same entity.

There are generally three different types of requests. There is a search type of request where users enter search string queries (e.g., Google adsense for Search). Another request is a content request (e.g., Google adsense for content). The advertisements are content such as news stories. For these types of requests, often it is desirable to identify the content of the page from which the request was received, e.g., from keywords or URL. The third request is an error search (e.g., Google adsense for errors). This covers cases where a user inputs a malformed request or a browser inputs an invalid URL in the request. This request returns advertisements despite an error in the request.

As used herein, the term "optimize" is used to refer to the process for determining factors which lead to an increase in user response versus a status quo or decrease in user response. Thus, in the present invention, the term "optimize" is not necessarily used to define a "best" result, but a desired increase in results which can, in some cases, actually be the best result. Using the present invention, users will view optimized advertisements that are selected based on optimized parameters in a request rather than advertisements that are displayed strictly on keyword matching and contract negotiations. The benefit of providing advertisements based on optimized request parameters will provide better targeted advertisements as well as a better overall experience for the user, as measured by the user response to the advertisement. Naturally, an added benefit from increased user response to advertisements is the increased revenue received by suppliers, and, ultimately, the merchant.

In one embodiment, optimization includes altering requests with a keyword. As used herein, the term "keyword" refers to any alphanumeric string, including any number of words, phrases, numbers, or a combination thereof. In some cases, the words, phrases, numbers, etc, can be separated by a space, comma, or other delineator.

Referring now to FIG. 1, a more detailed description of features of the present invention will be provided referencing a computing system 100 that can, in one embodiment, be a networked computing system. FIG. 1 illustrates that a plurality of requesters 102A, 102B, 102C (referred to generally herein as requester 102) can communicate with a routing system 104. Requester 102 can be one of various sources, such as, but not limited to, search requesters, content requesters, email servers, instant messaging servers, RSS servers, alerts servers, poll servers, and the like. The requester 102 may be accessed by any number of individual users represented by reference numerals 103A, 103B. Each user 103 may have additional information relating to the context in which the user is making the request, which can be taken into account in addition to information from the requester 102 when optimizing requests.

In addition, routing system 104 can communicate with a plurality of advertisement suppliers 114A, 114B, 114C (referred to generally herein as supplier 114) which provide advertisements in response to requests from requester 102. Thus, the routing system 104 exists as an interface between the requester 102 and supplier 114.

Requesters 102 send requests to routing system 104 by making an API call and sending request parameters, which will be described in further detail below. A requester 102 can identify request parameters in a couple of ways. First, the requester 102 can use an API specified by the routing system 104 that tells the requester which parameters to send, depending on the type of requester. For example, if the requester is a search engine, the search engine will be asked to provide a certain set of specified parameters.

Second, the requester 102 can fill out a channel request preference that is stored in the administrative system 124, described below, so that the same information is used for the request parameters in each request for that requester 102. In the embodiment where a requester 102 maintains a channel request preference in the administrative system 124, it is only necessary to obtain any parameters that are changing for a particular request. Thus, a channel request preference can minimize the amount of information that a requester 102 needs to provide in a request.

The requests can be made in various ways. Exemplarily, three methods will be described. However, those of skill in the art will recognize that other methods exist for making requests to routing system 104. In one embodiment, the requester 102 may be a client having a browser rendering a web page. The web page may include an i-frame element that, when detected by the client browser, sends an HTTP request and makes an API call to routing system 104 using the URL identified in the i-frame element. The routing system 104 sends the advertisements back to the requesting browser which displays the advertisements as instructed by the i-frame element.

In another embodiment, a requester 102 may make an XML request. Since XML is a server-to-server communication language, instead of a browser making the request, the XML website serving the web page makes the request to the routing system 104. In one embodiment, the XML web page server uses a URL connection package, be it a server side utility or other software component that may also include some dynamic libraries, to open a connection with the routing system 104 and pass the request parameters.

In yet another embodiment, the service provide administrator of the routing system 104 can provide Javascript scripting that sets some Javascript variables. The scripting is embedded in the requester web page or called by the web page. When the web page is rendered, the scripting constructs the request and the browser sends the request to routing system. The routing system 104 returns a Javascript array which is processed on by the requester 102 to read the array and to render the advertisements on the requester browser.

Table 1 illustrates various parameters that can be included in a request and/or channel request preference, with a brief description of each parameter following. In one embodiment, the request parameters are exposed to the requester 102 to provide the information dynamically. Alternatively, most of the parameters can be pre-configured by a requester in the channel request preferences.

TABLE 1

Exemplary Request Parameters

Channel ID
Sub-channel ID
Search string
URL
Search keywords
Breadth
Hints
Content
Advertisements
Number
Output Format
Test
Locale/language
Zip Code
City
State
Country
Page Number
Supplier Index
Local Filter
CSS
Call Back
Safety Mode
Input Encoding
Output Encoding
Supplier Client Id
Supplier Channel Id
IP address of client
Referrer URL
Connection Speed
Browser user agent
String
Brand of user
Web or aol
Position Tracking
Keyword Weighting
Category
Crawling Authorization
Optimization
Parameter Priority
Keyword Weighting
Category
Crawling Authorization
Optimization
Priority
Blending Instructions
Keyword Override The Channel ID and Sub-channel ID parameters are used to identify the requester 102. In the administrative system 124, described below, the requester 102 identifies the Channel ID and any Sub-channel IDs in its channel request preference. The Channel ID can be broadly associated with parameters that apply to all the pages in the channel. However, the sub-channel ID allows a requester 102 to further identify parameters for specific pages within that sub-channel, which essentially override the main channel parameters.

The Search String parameter can be used for a search type request. This parameter identifies one or more keywords input by a user to search for content relating to that keyword. The search string parameters are usually used without modification to provide optimized advertisements.

The URL parameter identifies the source of content to which the advertisements should be targeted. In one embodiment, the URL parameter can be used to identify the content of the source and also, in some cases, identify the context of the source.

The Search Keywords parameter allows the requester to send information about the requester source, such as keywords or metatag information. In one embodiment, keywords in the Search Keywords parameter can take priority over other methods of determining content of the requester source.

The Breadth parameter allows the requester to define a broad or exact advertisement search. A breadth parameter defined as "exact" requires an advertisement that exactly matches the parameters included in the request. A breadth parameter defined as "broad" grants more flexibility to provide advertisements from, for example, other suppliers than actually requested.

The Hint parameter is used in addition to the other ways of identifying content for the requester source. For example, in one embodiment, the Search Keyword parameter is a story about a specific basketball team, and the Hint parameter can be "NBA basketball" to provide some additional general category information. The Hint parameter can also be used in conjunction with the URL parameter which allows for crawling source pages to identify content.

The Content parameter can be used, for example, with dynamically generated content that cannot be crawled in which case the URL will not be passed in the URL parameter. The Content parameter allows a requester 102 to pass a content description of the source to the routing system 104, which could potentially be a large amount of data. One way in which the Content parameter can be beneficial even where a URL is identified is to pass user-specific content. User-specific content cannot be accessed through a URL because it is user-dependent. For example, if the user has a customized URL, this cannot be ascertained by merely accessing the URL. In one embodiment, the Content parameter can take priority over crawling a source for content.

The Advertisements Number parameter identifies the number of advertisements that should be returned to the requester 102. The Advertisements Number can be combined with blending instructions (see below) to identify pages of advertisements. Briefly, blending instructions identify positioning for advertisements. For example, if the blending instructions identify advertisement positions 1 through 100, and the Advertisements Number parameter is set at 10, then the number of pages of advertisements that can be displayed are 10 pages with 10 advertisements for each page.

The Output Format parameter identifies the format in which advertisements are to be sent back to the requester 102. The output format mirrors the format in which the request was received. Exemplarily, different types of formats of a request can include, but are not limited to, HTML, XML and Javascript.

The Test parameter identifies whether a request is a test or not. If a requester 102 is testing a channel and making requests for advertisements, then they would likely want to also test the click through functionality. Since advertisement revenue is based on click-throughs, the requester is potentially using up a supplier's revenue if the click-through is only a test. The Test parameter is used to inform the routing system 104 whether the request is a test or not so that the supplier will not be charged for any subsequent click-throughs.

The Locale/language, Zip Code, City, State, Country parameters provide location information for a user.

The Page Number parameter defines which page of the advertisements to return. So, if blending instructions define 1 through 100 advertisement positions, and the Advertisements Number parameter indicates that there are 10 advertisements in each page, the Page Number parameter identifies which of those pages should be returned. Thus, different page numbers can be specified in related requests and the Page Number parameter allows different pages of advertisements to be changed each time.

The Supplier Index parameter is used to cycle ads at the supplier end. The supplier may have fifty advertisements available for a certain keyword. Ideally, the advertisements will be indexed so that the best advertisements are ranked first (e.g., based on bid price). The Supplier Index parameter identifies a starting index in the supplier list of advertisements at which to begin providing advertisements. The Supplier Index parameter can change for each request (e.g., if a user is paginating through search advertisements that display sponsored links) so that the same advertisements from the supplier are not returned every time. After the supplier 114 makes a first response, then the routing system 104 is able to identify how many advertisements are left in the supplier inventory. The first time a request is made, the routing system returns the first 10 advertisements along with a token that identifies the starting index number. When the token is returned, the routing system 104 knows to return a different indexing of advertisements and to report what index number the routing system 104 used.

The Local Filter parameter is used for retrieving local or national advertisements. When the Local Filter is set to "local", the routing system 104 uses the Zip Code, City, and/or State parameter to identify advertisements. The Local Filter parameter could also be set to "local and national", i.e., using the Zip Code, City and/or State parameter, but also identifying national advertisements. In addition, the Local Filter parameter could specify only "national" in which case the routing system 104 will disregarding the Zip Code, City, and/or State parameters.

The CSS parameter is used to identify the URL of the style sheet which the requester 102 uses to format its advertisement display. The CSS parameter is generally used when the request is made using an HTML request. The Call Back parameter is used for Javascript requests to identify the name of the function on the page that renders the advertisements display.

The Safety Mode parameter is the adult filter to prevent unwanted advertisements.

The Input Encoding parameter and Output Encoding parameter applies to the character set to use for incoming requests and returned advertisements. The backfill is UTF8, which basically covers all the different characters. In another embodiment, a requester ca request a downgraded character set.

The Supplier Client ID and Supplier Channel ID parameters correlate the Channel and Sub-channel ID parameters with corresponding supplier identification information. For example, Google has its own reporting and revenue categorization. The Supplier Client ID and Supplier Channel ID parameter is sent to the supplier and conforms to the supplier identification scheme so that the supplier can identify the requester 102 and can better identify advertisements that fit the request parameters.

The IP address parameter identifies the IP address of the client browser for the user. For server-to-server calls, it is important for the server to identify the IP address of the user.

The referrer URL identifies a URL from which a user may have been redirected to reach a request source.

In addition, various reporting parameters may be identified to determine where the traffic is coming from as well as connection speeds. These types of reporting parameters can be useful to determine whether any of them play a part in the quality of the advertisements returned, the user response to advertisements, and the like. The Connection Speed Parameter identifies the connection speed of the requester 102. The Browser User Agent String parameter is used for identifying the browser version from which a request is made. The Brand parameter identifies a particular supplier that is requested. The Web/Client parameter identifies whether the request is being made from a browser application or from a client application.

The Position Tracking parameter is used to optimize positioning of the advertisement on a user interface. The Position Tracking parameter can tie into a broader scheme for optimizing layout of all content on a user interface, in addition to display of advertisements.

The Keyword Weighting parameter allows the requester 102 to assign usage weights to keywords. Based on the keywords and usage weights, routing system 104 can define certain requests. For example, if a requester 102 wants to use a first keyword 70% of the time and a second keyword 30% of the time, the routing system 104 routes 70% of the requests from that requester 102 using the first keyword and 30% of the requests from the requester 102 using the second keyword. Note that one aspect of the present invention is to optimize the keywords that should be used in requests and to identify the usage percentage of keywords based on user response history. Thus, in one embodiment, the present invention may override a predefined usage weight defined by the requester 102.

The Category parameter allows a requester 102 to identify a category for the request. The topics can include entertainment, sports, news, and the like. For example, a certain source content may be categorized under the broad category of sports and subcategory of football. The categories may be specified by the content provider. Or, alternatively, the categories may be gleaned from the URL, content of the web page, keywords in the HTML script, meta tags, parameters in the URL, and the like.

The Crawling Authorization parameter provides an indication that the page needs authorization before system 100 can crawl the URL identified in the URL parameter.

In a channel request preference, the requester 102 can define the percentage of requests to be optimized—from zero to 100 percent. However, the Optimization parameter can be used to send a particular request through the optimization process to view what the optimized advertisements would look like which would override a predefined preference to not optimize any requests.

The Priority parameter allows a requester to reverse the precedence between two parameters. Where normally one parameter might take precedence over another, when this parameter is selected, the reverse will hold true.

The Blending Instructions parameter indicates the positioning and number of advertisements to obtain from each of various suppliers 114. For example, the Blending Instructions parameter may specify to obtain seven (7) advertisements from a first supplier and three (3) advertisements from a second supplier and can order the position in which these advertisements will be displayed.

The Keyword Override parameter provides instructions for conditions when keywords should be overwritten and what keywords should be used to override.

Other parameters can be included in a request depending on the type of optimization that will be performed and may vary from the list described above. For example, other information that may factor into optimization is the demographics of users making requests, the time and date of the request, and a user's history of past searches. This type of information can be included in a request as parameters, but may also be accessible via other methods such as accessing a business database holding demographic or search history information for a particular user.

In addition, a supplier 114 can configure a supplier request preference. Table 2 illustrates parameters that may be included in a supplier request preference. The supplier request preference maps the input of request parameters with specific inputs preferred by the supplier. For example, as illustrated in Table 2, parameters in a request may be indicated by a certain code. The supplier preference maps the request code with the preferred supplier code so that the request parameters are compatible with the system of supplier 114.

TABLE 2

Exemplary Supplier Request Preference

| Parameter | Request Code | Supplier Code | Required? |
|---|---|---|---|
| Ad Type and Count | | ad | Yes |
| Language | | hl | No |
| Search string | squery | Q | Yes |
| Output Format | of | output | Yes |
| Test | stest | adtest | Yes |
| Locale/language | glcp | lr | No |
| City | gcs | gcs | No |
| State | gr | gr | No |
| Country | gccp | cr | No |
| Supplier Index | nt | adpage | Yes |
| Safety Mode | ssafe | adsafe | Yes |
| Input Encoding | sh_ie | ie | No |
| Output Encoding | sh_oe | oe | No |
| Supplier Client Id | sclient | client | Yes |
| IP address of client | sip | ip | Yes |
| Browser user agent string | cua | useragent | Yes |

In addition, the supplier request preference may indicate additional parameters that should be included in a request to a particular supplier. For example, the Ad Type and Count parameter specifies whether the advertisements should be wide or narrow and the count for each type. An Ad Type and Count parameter defined as "narrow" requires an advertisement that exactly matches the keywords included in the request. An Ad Type and Count parameter defined as "wide" grants more flexibility to provide advertisements from, for example, other related keywords than actually requested. The language parameter also identifies the language in which to serve the ad.

When a request is received by routing system 104, the routing system determines how to handle or direct the request. The request parameters can first be analyzed by a request module 106 that identifies whether necessary parameters were provided. For example, the minimal information needed for a search type requester is the Channel ID and Sub-channel ID parameter (which both serve to identify the requester) and the query string. If a required parameter is not ascertainable, the routing system 104 sends an error to the requester 102 to provide necessary parameters.

The request module 106 will access the channel request preference from the administrative system 124 and may augment the request with any parameters defined in the channel request preference. The request module 106 may also alter any parameters with parameters defined by a supplier 114 in a supplier request preference. Furthermore, the request module 106 may apply any overrides that are specified in the administrative system 124. As used herein, the term "base request" refers to any request that has not been optimized. That is, a base request may be enhanced to include the necessary parameters, but the enhancements will likely not produce advertisements that are more likely to increase the user response. A base request can still function as a valid request and can be sent through to the supplier 114 to obtain advertisements in response to the base request. The advertisements from the base request are received at the routing system 104 and sent back to the requester 102.

An "optimized request" is one that has been analyzed to determine content and/or context of the request to determine whether the base request needs to be altered to produce advertisements more likely to produce a higher user response. If a request is to be optimized, the routing system 104 determines whether the request has previously been altered with optimization parameters. This can be easily done by identifying the Channel ID, Sub-channel ID and/or keyword parameter of the request and matching with an optimized profile corresponding to the same Channel ID, Sub-channel ID and/or keyword parameter.

The optimized profile will contain various optimized parameters. For example, one parameter that the optimized profile may contain is a list of optimized keywords. The optimized profile may also indicate with which suppliers to use the optimized keywords and the percentage of usage for using a particular keyword. The request module 106 then uses the optimized profile parameters to alter the base request to form an optimized request. For example, the request module 106 can alter the keywords and identify specific suppliers 114 to which to send the optimized request. The advertisements obtained in response to the optimized request are received at the routing system 104 and sent back to the requester 102. Thus, as used herein, the term "altered request" refers to a request or base request that has been altered to include parameters from an optimized profile.

If the request is to be optimized (e.g., the first receipt of a request from a particular Channel ID, or a periodic optimization of the optimized profile), routing system 104 passes the request to optimization engine 116. While optimization engine 116 will be described further below, generally, the optimization engine 116 analyzes the parameters of a base request and develops an optimized profile. As discussed above, the optimized profile will contain various optimized parameters that the routing system 104 then uses to alter a request. The optimization engine 116 may access various sources of information to generate the optimized parameters.

The routing system 104 uses the optimized profile to alter the request. As discussed above, the routing system 104 may also enhance the altered request applying the channel request preference, supplier request preference and any applicable overrides. The altered request is sent to the identified supplier 114 and routing system 104 sends the advertisements returned from the supplier(s) to the requester 102.

The number of suppliers 114 can vary. In one embodiment, the present invention provides a standardized interface that can provide self-service advertising platforms and enable intermediaries to purchase advertisements. This enables a supply-chain controlling a large volume of advertisement revenue. This can potentially diversify revenue by allowing potentially hundreds to thousands of suppliers to take advantage of the optimizing systems and/or processes of the present invention.

In one embodiment, a supplier 114 can include an application programming interface (API) that allows the routing system 104 to make a call to the various suppliers 114. The API call can include request parameters for the supplier 114 to determine whether the supplier can return advertisements matching the requested criteria. The advertisements sent from the supplier 114 can also be reviewed by routing system 104 to ensure that the content of the advertisements matches the API request.

In one embodiment, routing system 104 may send different altered sub-requests to different suppliers 114. Some of the parameters of the different altered sub-requests may be the same while some parameters may be different. The routing system 104 can maintain the main altered request to make sure that the combination of advertisements received from the different altered sub-requests conforms to the parameters in the main altered request, for example, the blending instructions.

Routing system 104 obtains the advertisements from suppliers 114 in the form of a response that may indicate a plurality of response parameters. A response module 117 can be used to analyze the responses from each supplier and modify the response, if necessary. Response module 117 may combine the various advertisements from altered sub-requests to form a final response complying with the main altered request (e.g., blending instructions). Response module 117 may also access channel response preferences in administrative system 124 to enhance the response to conform to the particular preferences of a requester 102. In addition, the channel response preference can include preferences to review the advertisements for unwanted content and reject certain advertisements.

Table 3 illustrates parameters that can be included in a channel response preference defined by a requester 102 for responses directed toward that requester.

TABLE 3

Exemplary Response Parameters

| Parameter | Response Code | Supplier Code |
|---|---|---|
| Response | mainTag | RES |
| Advertisements | advertisementElementsTag | ADS |
| Advertisement | adTag | AD |
| Title | title | LINE1 |
| Advertisement URL | redirect_url | AD.url |

The Response parameter identifies the transmission from the supplier 114 as a response containing advertisements. Similarly, the Response parameter identifies the transmission from the routing system 104 to the requester 102 as a response containing advertisements.

The Advertisements parameter identifies the existence of advertisements. The Advertisement parameter identifies a first advertisement. The Title parameter may be used to provide the advertisement with a description of the advertisement. The Advertisement URL indicates a URL to which users can be directed to access the advertisement. In one embodiment, the Advertisement URL will be directed through routing system 104 first before redirecting the user to the advertisement supplier 114. In other words, the routing system 104 may replace the Advertisement URL with a URL identifying the routing system 104 instead of the advertisement supplier 114. Other parameters may be included in a response from the supplier 114 or routing system 104 as understood by those of skill in the art.

As also shown in FIG. 1, since routing system 104 is intermediate the requesters 102 and the suppliers 114, routing system 104 also tracks the incoming requests in request logs 118. The routing system 104 also tracks the user response to the advertisements using an advertisement click log 120 to track the click-through that various advertisements receive. Routing system 104 can also include an advertisement return log 122 to track the advertisements returned from suppliers 114.

Routing system 104 further includes a clocking module 132 and a backfill module 134 which will be described in more detail below. However, briefly, the clocking module 132 ensures that advertisements are returned in a timely manner. If a supplier 114 is unable to fulfill a request, then the backfill module 134 can be used to provide backfill advertisements using various methods. Finally, routing system 104 includes a safety configuration module 146, a file system 148 and memory 150 that can be used with a safety configuration described further below.

FIG. 1 also illustrates that routing system 104 communicates with an administrative system 124. Administrative system 124 performs various administrative functions such as stores various administrative, channel, and/or supplier preferences defined using preference system 126, generates reports by reporting system 128, and maintains a data warehouse 130. The preference system 126 allows, for example, requester 102 to specify a channel request preference or a channel response preference and supplier 114 to specify a supplier request preference. Details of the preference system 126 will be described further below.

The reporting system 128 provides various reporting capabilities including monitoring click-through rates, supplier response times, average number of advertisements returned by each supplier, block filter reports, detailed revenue reports, and the like. At least some of the basis of this analysis can come from information sent from routing system 104 (e.g., via request logs 118, advertisement click logs 120 and advertisement return logs 122). In addition, some of the information may also come from third party feeds 140 as illustrated in FIG. 1. The reporting system 128 provides feedback to the optimization engine 116 to determine the effectiveness of the optimization engine 116 so that the optimization engine can continually refine and update its effectiveness. Reporting system 128 may also generate financial reports to ascertain revenue owed to the optimizing service provider and to various suppliers 114. Reporting system 128 will be described below in further detail.

Data warehouse 130 stores the system data which can include administrative preferences, channel preferences, supplier preferences, financial information, filters, block lists, backfill advertisements, reports, as well as system configuration data.

Figure 2A:
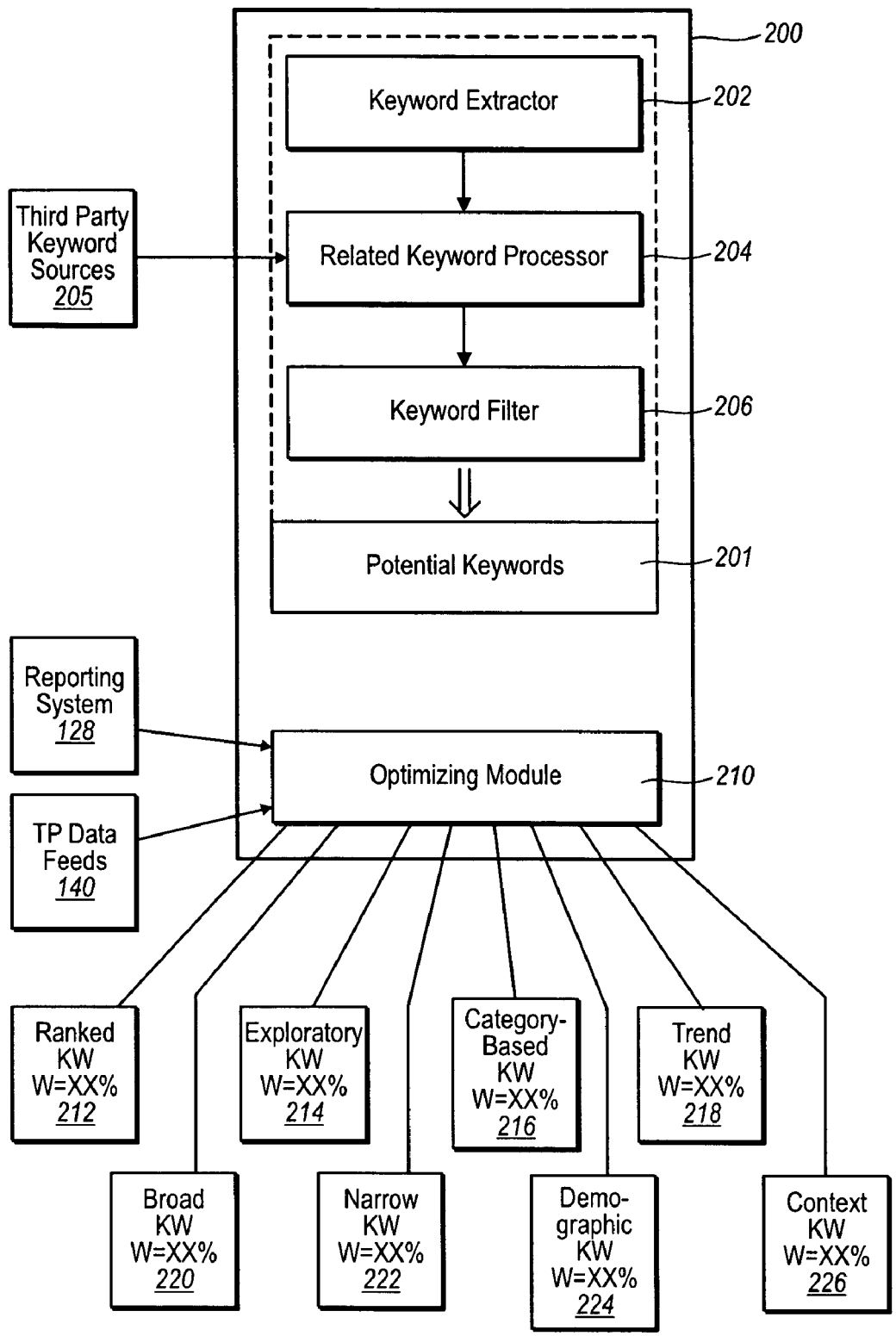
FIG. 2A illustrates the operation of an optimization engine in further detail, according to aspects of one embodiment of the present invention.

Turning now to FIG. 2A, optimization engine 116 is described in further detail. The optimization engine 116 can be invoked by routing system 104 using an in-process API call or an external protocol, such as HTTP, XML, SOAP, and the like. As described above, optimization engine 116 generates optimized parameters that can be used to form altered requests intended to maximize user response to advertisements obtained in response to a particular request. The optimization can be based on content and/or context of the request as well as other factors such as, but not limited to, keyword value, which can be accessed independent of the request. Optimization engine 116 determines which keywords provide the most value for a particular request, and can also determine which keywords provide better value for particular suppliers 114. The optimization engine 116 uses historical and real-time data analysis to return the most optimized parameters for a particular request.

Optimization engine 116 also dynamically tests keywords to attempt to find the best keywords for certain requests. This can include rotating various keywords known to provide value. In addition, this can include testing new keywords to ascertain their performance. Additionally, optimization engine 116 operates to find the best blending of advertisements that will provide the most value to a user.

Figure 3:
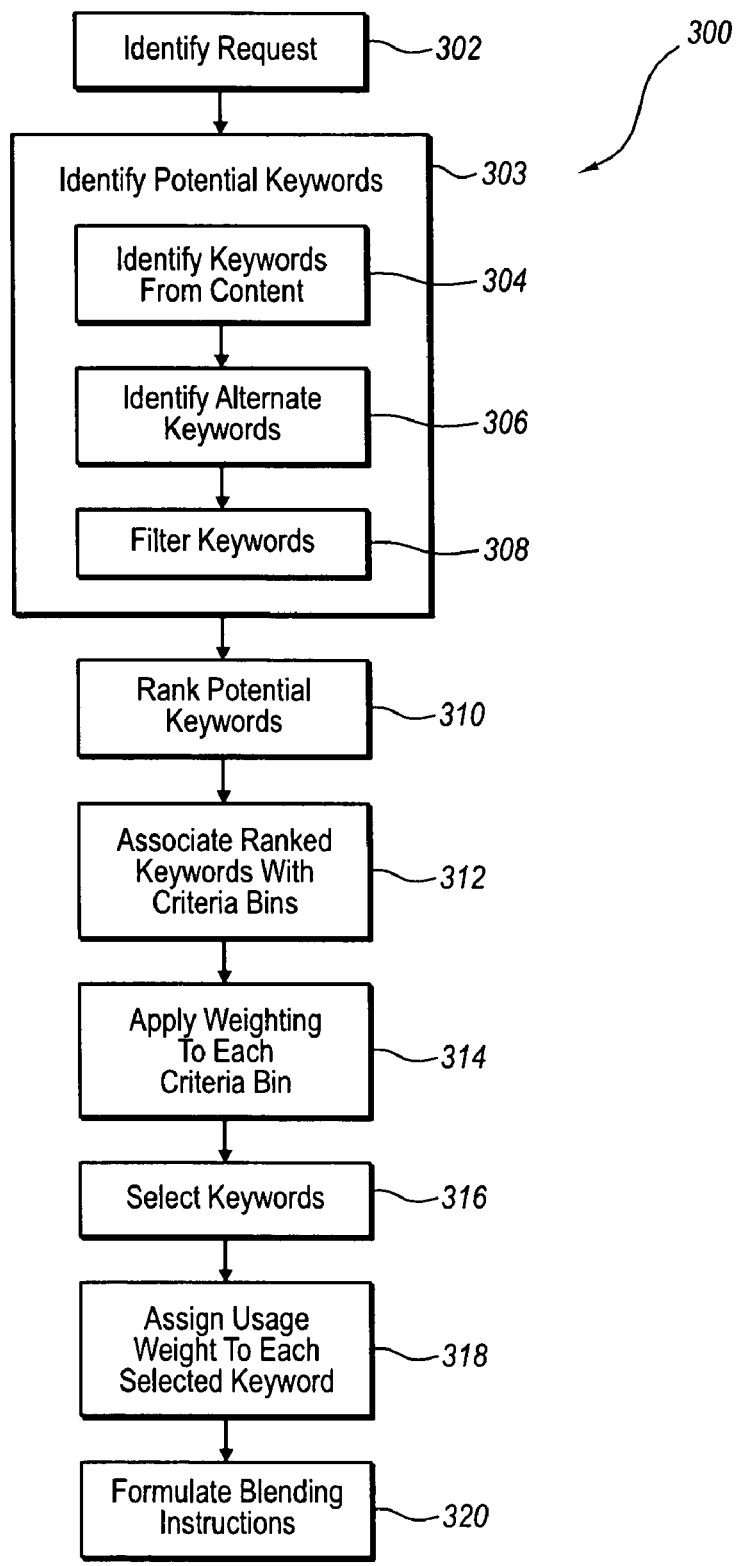
FIG. 3 illustrates an exemplary method for identifying keywords to be used to alter advertisements requests according to aspects of one embodiment of the present invention.

FIG. 2A illustrates an embodiment of optimization engine 116 and processes configured to perform these and other features. FIG. 3 illustrates an exemplary method 300 for identifying optimized parameters using, exemplarily, optimization engine 116. Method 300 assumes that the routing system 104 has determined that the request should undergo optimization and so the method begins at the optimization engine 116. It will be appreciated that some of the stages of method 300 can be modified, performed in a different order, eliminated, and that additional stages may be added. The method 300 may be practiced, for example, in the embodiments of the computing system described herein. Thus, the description of the stages of method 300 will be described in the context of system 100, realizing that other systems may be used to perform the stages thereof.

Method 300 includes at 302, optimization engine 116 identifies a request. At 303, the optimization engine 116 identifies potential keywords 201 associated with the request. The optimization engine 116 may perform various processes to identify potential keywords 201. For example, at 304, keyword extractor 202 identifies keywords based on the content of the request source. The keyword extractor 202 may identify keywords identified in the request. In cases where the request may be lacking keywords, or where additional keywords would be desirable in order to ascertain the most optimal parameters, keyword extractor 202 identifies keywords using any of various techniques, such as crawling the content of a URL identified in the request. The keyword extractor 202 can be similar to a spider or web crawler. The keyword extractor 202 may also identify other sources of content, such as the content, category or hint parameters, mentioned above.

The keyword extractor 202 can also include an index analyzer that ranks the identified keywords into a rank/density listing. Weight can be given to certain content, such as words in meta tags, word frequency, positioning of words in a document, HREF links, headings, title, and the like. FIG. 2B illustrates an example of a rank/density listing for a sample web content. In a hypothetical example that will be used throughout this description for purposes of illustrating the systems and processes of the present invention, suppose the request does not have any keywords, but identifies a URL, such as www.example.com/realestatenews/sellers/homeworth. In this example, keyword extractor 202 may generate the following list of content keywords/phrases: realtors; home; real estate; bedrooms; bats; fireplace; pools; taxes; interview; capsule.

At 306, related keyword processor 204 identifies alternate keywords that may or may not be based on the content of the base request. In one embodiment, the related keyword processor 204 can select keywords from one or more alternate third party keyword sources 205. The alternate keyword sources 205 can identify related keywords based on, for example, but not limited to, natural language processing (e.g., synonyms), relevancy to the content of the web page, current hot items or buzz words for the day, historically popular keyword for the given day (e.g., on same day last year, or upcoming popular seasonal keywords such as Mother's Day), time of day (e.g., evening keywords may be different than morning keywords), time of week (e.g., weekday keywords versus weekend keywords), and the like. For example, alternate keyword sources can be synonym services, related terms services, CPC services, hot topic services, etc. FIG. 2C illustrates an example of hot topics from Whats Hot for a particular day based on category. In addition, the related keyword processor 204 can also obtain access to past search history and/or demographics to obtain additional keywords that may be relevant to the context in which a user is making a request.

For the hypothetical example, an alternate keyword source 205 may access an external keyword source (e.g., What's Hot (House & Home)) and produce the following list of alternative keywords: buttercream frost, children's day, father's day poems, David Bruce, tropical fish, cesky terrier, interior design, real estate, dill, wirehaired pointing. In addition, in this hypothetical example, the alternate keyword source 205 may identify past search keywords as: Bahamas, babysitters, vacation homes, movies.

At 308, a keyword filter 206 removes unwanted keywords. Keyword filter 206 can access administrative system 124 to obtain administrative preferences or channel request preferences which may specify block lists to filter out certain keywords based on unwanted content (e.g., adult controls or offensive material) or exclusivity (e.g., exclude keywords relating to competitors of the requester).

Thus, the optimization engine 116 can identify potential keywords 201 by identifying various sources of keywords as well as sources of eliminating keywords. As illustrated, the potential keywords 201 can be associated with the content or the context of the base request.

At 310, an optimizing module 210 takes the potential keywords 201 and develops a final ranking of the potential keywords. In one embodiment, the ranking can be based on user response history for a particular keyword, the user response history being based on, but not limited to, the click-through-rate (CTR), cost-per-click (CPC), ad response percentage (ARP) associated with a keyword. To identify the user response history for a particular keyword, the optimizing module 210 can access business logs stored in data warehouse 130 that holds reports identifying the CTR, CPC and/or ARP of various keywords that have passed through the routing system 104. Other factors that may represent the value of a keyword that may not be disclosed, but are understood by those in the art, may also be used.

The CTR is generally dependent on the context in which the advertisement is presented. For example, an advertisement obtained in response to a particular keyword may have more success in one channel than another channel. Furthermore, a keyword may have a higher CTR for one supplier than for a different supplier. Thus, the CTR for the same keyword is tracked based on the supplier for which it is used, category to which it applies, specific channels and sub-channels to which it has been used, and various blending instructions with which the keyword has been used. FIG. 2D illustrates a sample report that shows keywords click throughs based on channel, sub-channel. Thus, the optimizing module 210 can identify the CTR that best applies to the particular request— i.e., for a particular supplier, category, channel, sub-channel, and blending instruction that the request specifies. Note that CTR may also be supplied by third party feed 140.

The optimizing module 210 may also access third party feeds 140 to identify the CPC for keywords in the potential keywords 208. The optimizing module 210 may produce a bid feed table that tracks the range of CPCs for a keyword and for particular users which charge that bid price. FIG. 2E illustrates an example of a bid feed table. The CPC data can be obtained frequently to ensure that the CPC data is current.

The optimizing module 210 may also access reports in data warehouse 130 that indicates the ARP for various keywords for different suppliers. Generally, a higher ARP contributes to a higher value given to a keyword.

Because CTR, CPC, and ARP can be correlated with specific suppliers, a user response history can also be identified for potential keywords that have been previously used in requests to specific suppliers. Thus, at 310, ranking the potential keywords can also include ranking the potential keywords for a specific supplier based on the user response history.

At 312, optimizing module 210 associates the potential keywords 201 with various criteria bins that represent criteria that may be important in the determination of the optimized profile. The bin criteria can be set by the optimizing service provider (i.e., administrator). Alternatively, a requester may identify which criteria bins to factor into the optimization, e.g., in a channel request preferences. Note the optimizing module 210 is not required to rank the potential keywords 201 before associating the potential keywords with the criteria bins. However, for some criteria bins, ranking the potential keywords 201 may be a preferred first step in order to identify which of the potential keywords 201 should be placed in that particular bin.

Ranked keywords bin 212 holds keywords having a high ranking score. Exploratory keywords bin 214 holds keywords for which perhaps some ranking information is unknown, so that the keywords do not perhaps rank extremely high. However, the exploratory keywords may be desirable to be able to obtain future CTR, CPC, ARP or other performance data to test if these keywords hold any value. Category-based keywords bin 216 holds keywords having high relevance to the content of the request source, regardless of whether the keyword was found in the content of the request source or has a high ranking score.

Trend keyword bin 218 can hold keywords that are identified to be popular even though they may not have a high ranking score or may not necessarily be relevant to the content of the request source. Trend keywords can be based current event, seasonal aspects, time of day, time of week, and the like. Broad keywords bins 220 and narrow keyword bins 222 hold keywords based on their performance on a broad search or a narrow search. For example, some suppliers 114 return certain advertisements based on a narrow search term, while other advertisements can be supplied regardless of the keywords. Thus, certain keywords may have more narrow search capabilities, while others may broader search capabilities.

Demographic keyword bins 224 holds keywords relating to various demographics. For example, a bin can exist for women, men, teens, children, each bin holding keywords that are most popular for that particular demographic. The number of demographic keyword bins may vary, but are generally represented by reference numeral 224. Demographic keywords can be collected by tracking user IDs for click-throughs and associating the click through with demographic information pertaining to the user id. This will generate, over time, a sense of which keywords certain demographic portions respond to, which will enable generating a bin for a demographic criteria and placing keywords that that demographic sector has responded to. The response by demographic sectors can also affect the weight associated with a particular demographic bin. For example, particular request may be requested 75% of the time and only 25% of the time by women. Thus, for the potential keywords associated with this request, a demographic bin holding keywords popular with men may be given a higher weighting than a demographic bin with keywords associated with women.

Context keywords bin 226 includes keywords that relate to user-specific information. For example, the context keywords can include keywords relating to the user's current interests, past interests, as well as system requirements. The context keywords bin 226 may include keywords relating to a user's past search history, even if the keywords do not necessarily relate to the content of the request source. For certain requests that are received from certain communication platforms, the context keywords may play a significant part in what keywords are included in the optimized profile. For example, for instant messaging, the context keywords may include the specific geographical location, age, gender, past searches, operating system, video capabilities, audio capabilities, CPU requirements, and available memory. (Note for requests that rely heavily on context-based ad advertisements, the frequency of performing the optimization may be increased since the context-based keywords likely change on a more frequent basis).

At 314, after the potential keywords 201 are associated with criteria bins, optimizing module 210 applies a weighting to each criteria bin to determine how heavily that criteria should factor into the optimized profile. For example, the optimizing module 210 may apply a greater weight to the ranked keywords bin 212 if user response history is an important factor. In another embodiment, the optimizing module 210 may apply a greater weight to the exploratory keywords bin 214 if the ranking service is more interested in testing new keywords. In one embodiment, a weight percentage is given to each bin so that keywords from each bin are represented in the optimized profile. The optimizing module 210 may also rank the keywords within a particular criteria bin. For example, the keywords in the ranked keyword bin 212 may be ranked according to ranking of the potential keywords to identify which keywords have the best user response based on user response history.

It will further be appreciated that a criteria bin may be sub-divided into the various suppliers 114 which affect the user response history. For example, the ranked keyword bin 212 can be further sub-divided by particular suppliers 114, ranking the keywords associated with each supplier by user response history. The optimizing module 210 can thus take into account blending instructions that may require a certain number of advertisements from particular suppliers 114 and accord a weighting accordingly.

At 316, the optimizing module 210 selects keywords from one or more criteria bins based on the weight assigned each criteria bin.

At 318, the optimizing module 210 assigns a usage weight to each of the selected keywords. The usage weight indicates the percentage of times that a particular keywords should be used to alter a request. The usage weight can be based on various factors including the ranking performed by optimizing module 210, the weight assigned the criteria bin, and the like.

At 320, the optimizing module 210 is able to use a prioritizing parameter to dynamically determine blending instructions. For example, the prioritizing parameter could be the bid feed ratio associated with the advertisements obtained for each selected keyword.

Table 5 provides an exemplary optimized profile for a particular request.

TABLE 5

Exemplary Optimized Profile

| | Keyword(s) | Usage Wt (%) |
|---|---|---|
| Supplier (A) | | |
| A | Realtors | 25.37 |
| A | Mortgage | 21.53 |
| A | Loan | 19.8 |
| A | california homes | 16.88 |
| A | Bahamas | 16.42 |
| Supplier (B) | | |
| B | Realty | 42.01 |
| B | Rentals | 2.0 |
| B | foreclosures | 2.0 |
| B | interest rates | 2.0 |
| B | movies | 1.99 |
| B | babysitters | 50.0 |
| Supplier (C) | | |
| C | Homes | 43.6 |
| C | real estate | 23.14 |
| C | Realtor | 20.09 |
| C | mother's day | 13.17 |
| Blending Instructions | B(2), B (1), A(1), A(1), A (1), C (1), B(2), A(1), A(1), A(1) | |

The above hypothetical optimized profile illustrates various things. First, looking at the first supplier A, the keywords in the optimized profile can be selected from any of the various criteria bins depending on the weight assigned to each bin. A usage weight is assigned to each keyword to indicate to the routing system 104 a percentage of times that the keyword should be used to alter a request. In one embodiment, the usage weight can be assigned dynamically to each keyword. Based on the hypothetical optimized profile, for every 100 times that routing system 104 receives a particular request, about 25 requests will be sent to supplier A, altering the request to include the keywords "realtors," if the request did not originally include the keyword "realtors".

The keywords in the optimized profile may relate to various criteria bins. For example, while a large number of the keywords and a large amount of weight can be given to highly ranking keywords, where it is desirable to identify keywords with high user response history, the optimized profile can also include a certain number of exploratory keywords, category-based keywords, trend keywords, broad keywords, narrow keywords, demographic keywords, and/or context keywords, depending on which criteria are desired to be included in determining the optimized profile.

Thus, one embodiment of the invention includes a method for identifying at least one altering keyword to be used to alter a request from a requester, the method including identifying a base request from a requester (302); identifying at least one potential keyword associated with the base request (303); associating the at least one potential keyword with at least one criteria bin (312); and identifying at least one altering keyword from the at least one criteria bin based on a weight given the at least one criteria bin, the at least one altering keyword to be used to dynamically alter the base request (312).

In another embodiment where it is desirable to identify keywords with high user response history, the present invention includes a method for increasing user response to advertisements from advertisement suppliers obtained in response to keywords, the method including: identifying a base request from a requester (302); identifying a first keyword and a second keyword associated with the base request (303); identifying a user response history associated with the first keyword and the second keyword (310); ranking the first keyword and the second keyword based on the user response history (310); and identifying the higher ranked of the first keyword and the second keyword to be used to dynamically alter the base request (312).

As can be seen from the above description of optimization engine 116, in one embodiment, because the optimized profile can be derived from keywords based on various criteria, this allows for dynamic variation of altering a request. When the optimized profile is returned to routing system 104, the routing system can dynamically vary the request parameters for similarly-situated requests due to the usage weight assigned each keyword in the optimized profile. By using other keywords such as other well-ranked words, exploratory keywords, category-based keywords, trend keywords, broad or narrow keywords, demographic keywords, and/or context keywords, the system 100 is not necessarily limited to using only the highest ranked keyword to alter a request. This is based on the premise that a history of high user response does not always necessarily predict high future response.

In addition to developing an initial optimized profile, the optimized profile can be updated on a periodic basis, e.g., every fifteen or thirty minutes, or on demand, which could potentially produce a different list of keywords with different usage weights. The keywords and weighting can be dynamically changed based on new observed behavior. This may be beneficial, for example, where popular keywords can migrate and be replaced with new popular keywords as the media and culture influence user response. Even though certain keywords may have a historically high user response, the same advertisements may not continue to produce the same level of user response. Keywords may also perform differently based on time of day. Therefore, it would be advantageous to provide alternative keywords rather than using the same keywords every time.

Various factors can affect a keyword's value over time. For example, historical CTR, CPC and ARP can affect the keyword's value. Furthermore, for a given supplier, the value of advertisements shifts over time even if the keywords stay the same. Another factor that can affect a keyword's value over time is advertisement inventory. That is, the supplier may pay for a certain number of responses (e.g., first 1000 responses). Or, payment may be made based on tiered response, i.e., $1.00 for the first 100 responses, $0.50 for the second 100 responses, $0.25 for the third 100 responses, and nothing thereafter. A variation of this is where a supplier changes its bid fee based on the time of day. For example, a supplier may pay $1.00 if a particular advertisement is responded to in the evening, but only $0.50 for click throughs that occur during the daytime. Thus, the value of a keyword may change due to changes in bid fee. The advertisement inventory of a particular supplier can also affect the dynamic altering of keywords or other parameters. For example, if the advertisement inventory from a particular supplier drastically falls below a required minimum, the optimizing module 210 can change the optimized profile to reduce the usage weight assigned to the keyword associated with those advertisements.

Over time, the validity of the keywords in the optimized profiles will be tested to ensure that the user is getting the best advertisements, with the added intelligence that accounts for factors that can affect keyword value. Therefore, the value of keywords may change over time and the same keyword may not always be the "best". However, the present invention also takes into account that certain keywords may be consistently relied upon and so can assign a higher weight to those keywords that consistently return high advertisements.

Thus, one embodiment of the invention provides for a method for dynamically rotating keywords to be used to alter a request from a requester, the method including: identifying a base request from a requester (302); identifying at least two potential keywords associated with the base request (303); and assigning a usage weight to each of the two potential keywords, the usage weight determining a percentage of times that each of the at least two potential keywords should be selected to dynamically alter the base request (316 and 318).

In yet another embodiment, the optimizing module 210 can identify the best keywords across different suppliers 114 for a particular request 102. That is, the same keywords do not necessarily produce the optimum advertisements from all suppliers. Thus, as shown in the hypothetical optimized profile above, the optimizing module 210 selects the optimal keyword or set of keywords that produces the best advertisements for each supplier. The above optimized profile also illustrates that the most valuable keyword may be different for each supplier 114. The altered requests to the different suppliers 114 can be sent at the same time with the routing system 104 using the usage weight to determine which keywords to use to alter a particular request.

This functionality is based on the possibility that each supplier 114 uses their own search and advertisement selection criteria and has a different selection of advertisements. Certain keywords may have greater success with some suppliers than others. For example, although a request may include the keyword "car," the optimizing module 210 may determine that while the term "car" returns advertisements getting a high user response for a first supplier, the search term "automobile" actually gets a more successful user response in response to advertisements from a second supplier. As discussed above, keywords relating to a certain supplier can be weighted independently of the weighting developed for other suppliers.

Thus, another embodiment of the invention includes a method for increasing user response to advertisements from advertisement suppliers obtained in response to keywords, the method including: identifying a base request from a requester (302); identifying a first and second keyword associated with the base request, the first and second keyword having both previously been used in requests to a first advertisement supplier (303); ranking the first keyword and the second keyword based on a user response history for each of the first keyword and second keyword (310); and identifying the higher ranked of the first keyword and the second keyword to be used to dynamically alter the base request to form an altered request to be sent to the first advertisement supplier (316).

The optimization engine 116 may also formulate optimized blending instructions to go along with the optimized profile. Dynamically adjusting blending instructions can further increase user response. In one embodiment, the optimizing module 210 can determine an ordering of advertisements from the various suppliers 114 that will produce the most favorable advertisements, with the advertisements placed highest in the list generally being those expected to produce the greatest user response.

The ordering can be based on the various factors listed above. This can include giving high priority slots to high CTR advertisements, high CPC, or based on other metrics. However, optimizing module 210 will be able to detect change in CTR and/or CPC and can alter the order of suppliers dynamically. In some embodiments, optimizing module 210 may recognize that some larger suppliers (e.g., Google) may have their own bidding system and return advertisements based on a comparable weighting function. Thus, the optimizing module 210 may not in all cases need to rely solely on its own bidding system, but may take into account the prioritization given at the larger suppliers. In another embodiment, as illustrated below, the blending instructions may be rearranged at the routing system 104 based on the advertisements that are actually returned from the suppliers 114.

Figure 4:
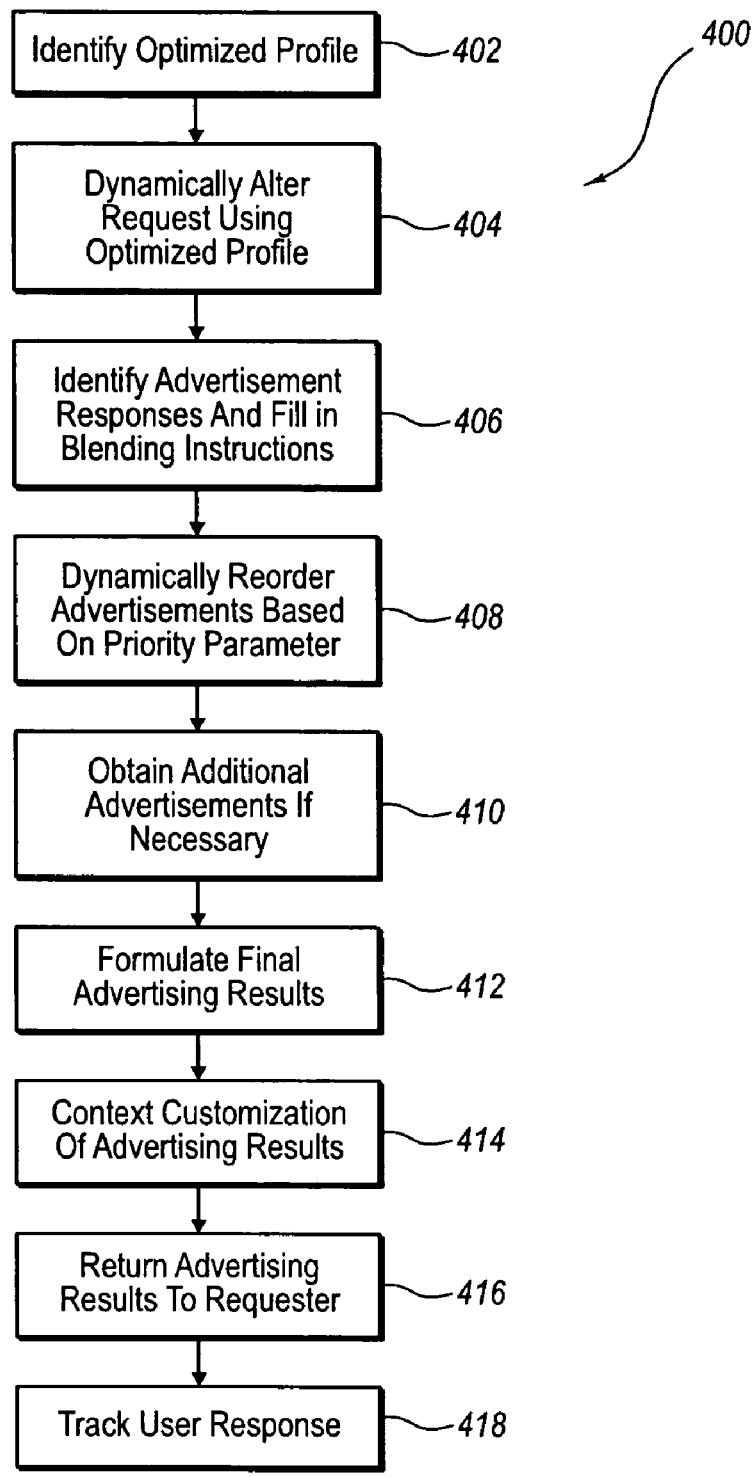
FIG. 4 illustrates an exemplary method for processing advertisements obtained using an altered request according to aspects of one embodiment of the present invention.

Turning now to FIG. 4, an exemplary method 400 for processing an optimized profile is depicted. At 402, routing system 104 identifies an optimized profile returned from optimization engine 116. At 404, request module 106 dynamically alters a request based on the optimized profile parameters. This can include dynamically altering a base request with the at least one keyword to form an altered request, dynamically selecting between at least two potential keywords based on a usage weight assigned each of the at least two potential keywords, and dynamically altering the base request to include the higher ranked of a first keyword and the second keyword based on a user response history, the first and second keyword having both previously been used in requests to a first advertisement supplier.

In the hypothetical optimized profile above, blending instructions requiring 10 advertisements to return to the requester, the request module 106 may send the following requests to three different suppliers, simultaneously:

Blending Instructions: B(2), B(1), A(1), A(1), A(1), C(1), B(2), A(1), A(1), A(1)

Request 1: Supplier A, keyword: mortgage
Request 2: Supplier B, keyword: realty
Request 3: Supplier C, keyword: real estate Sending requests to supplier 114 may include request module 106 accessing supplier request preferences in data warehouse 130 to specify certain parameters.

At 406, the response module 117 identifies advertisements returned from the supplier(s) 114. Assume that the response module 117 receives 6 advertisements overall, the response module 117 fills in the blending instruction slots with the advertisements.

Order of advertisements returned: B1(2[5.50]), B2(1 [2.45]), A1(1[2.50]), A2(1[1.45]), A3(1[1.25]), C1 (1[1.35])

At 408, the blending instructions may be dynamically reordered either for the first time or for a second time. The response module 117 can identify a prioritizing parameter associated with each of the advertisements returned from the suppliers. New blending instructions can then be identified based on the prioritizing parameter. For example, the advertisements may be rearranged to give, for example, higher bid prices a higher position. The response module 117 may be able to obtain the bid price for each advertisement and rearrange the slots giving bid price a higher priority. For example, rearranging the above order of advertisement returned based on bid price yields:

Rearranged blending instructions: B1(2[5.50]), A1(1 [2.50]), B2(1[2.45]), A2(1[1.45]), C1(1[1.35]), A3(1 [1.25])

Note in the embodiment above, when advertisements are rearranged, the order of the advertisements within the same supplier can remain the same (e.g., B1 precedes B2 and A1 precedes A2, A3). However, in other embodiments, the order of the advertisements with a supplier may also be rearranged.

In addition, a particular channel request preference may require that the maximum number of advertisements be returned. Thus, in the example above, the first response did not return the requisite number of advertisements. So, at 410, result module 117 can obtain additional advertisements to fulfill the blending instructions. Various methods of filling the remaining advertisement slots will be discussed below in further detail. In one embodiment, the additional advertisements can be optimized using any of the optimization methods described herein.

In one embodiment, results module 117 may make another request to one or more of the same suppliers or even a different supplier to obtain additional advertisement results. For example, a second request may be sent out simultaneously to all three suppliers that include the following parameters:

Number of advertisements needed: 4
Request 1: Supplier A, keyword: loan
Request 2: Supplier B, keyword: bahamas
Request 3: Supplier C, keyword: homes Note that in this second request, a different keyword is selected for each supplier. Other methods can be used to obtain additional advertisements, described below.

At 412, the advertisements from the second request are received and the response module 117 can either place on the advertisements from the second request in the bottom empty slots or, alternatively, can rearrange the advertisements based on bid price, as it did above. In one example, where the response module 117 fills in the empty slots at the end of the blending instructions, the consolidated advertisement result may look as follows:

Returned to Requester: B1(2[5.50]), A1(1[2.50]), B2(1 [2.45]), A2(1[1.45]), C1(1[1.35]), A3(1[1.25]), B(backfill), A(backfill), A(backfill), C(backfill)

At 414, the response module 117 may customize the advertisements based on user-specific information. For example, the response module 117 may determine that the requester's system has video capabilities and that video clips may produce better user response than simply embedded HTML. Thus, the response module 117 can analyze the advertisements from the suppliers 114 to identify which advertisements are in the form of a video clip and those may be returned to requester 102 rather than other non-video advertisements. At 416, the final advertisement results are sent to the requester.

At 418, routing system 104 and reporting system 128 tracks the user response to the advertisement results. The reports generated by reporting system 128 on a periodic basis can be used to provide performance results for keywords, specific suppliers, and blending instructions for various time periods. These results can then be used by optimization engine 116 to perform future analysis of advertisement performance by identifying revenue-generating event (such as a click or a phone call) with factors that may influence such an event, such as the choice of keywords, user demographic information, user geographic location, context, and the like. For some advertisements, the value is in the viewing of the advertisement and so the reporting system 128 may simply track of number of times the advertisement is shown. Furthermore, reporting system 128 can correlate the advertisements based on supplier 114 so that it is possible to track whether a particular keyword generates greater value from one supplier versus another.

Thus, in yet another embodiment, the present invention can include a method for dynamically ordering advertisements received from at least one advertisement supplier, the method including: identifying two or more positions in which two or more advertisements from at least a first advertisement supplier can be placed (402); identifying a supplier history associated with the at least first advertisement supplier (402); sending a request to the at least first advertisement supplier (406); receiving one or more advertisements from the at least first advertisement supplier (406); identifying a prioritizing parameter associated with each of the one or more advertisements (408); and dynamically ordering the one or more advertisements from the at least first advertisement supplier into the two or more positions based on the prioritizing parameter (408).

In another embodiment, the present invention includes a method for dynamically ordering advertisements received from at least one advertisement requester, the method including: identifying a base request from an advertisement requester (402); identifying a first keyword associated with the base request (402); dynamically altering the base request with the first keyword to form an altered request (404); sending the altered request to at least one advertisement supplier (406); receiving two or more advertisements from the at least one advertisement supplier obtained using the altered request (406); identifying a prioritizing parameter associated with each of the two or more advertisements (408); dynamically generating blending instructions identifying the positioning of the two or more advertisements based on the prioritizing parameter (408); arranging the order of the two or more advertisements based on the blending instructions (408); sending the rearranged two or more advertisements to the advertisement requester (416); and tracking response to the two or more advertisements (418).

In one embodiment, the reporting system 128 segments revenue to measure the effectiveness of the optimization engine 116. That is, the reporting system can identify which revenue resulted from a parameter suggested by the optimization engine 116 (i.e., in response to an altered request) and which revenue resulted from an unaltered request. In one embodiment, for each request, the routing system 104 may send the base request through to the suppliers 114. The reporting system 128 can track the revenue generated from the base request, which can be termed the base revenue. For each version of altered request that changes the base request, any increase in revenue compared to the base revenue can be tracked as optimized revenue.

In addition, later versions of altered requests can be compared to previous version of altered requests. So while a second version of an altered request may not realize a significant amount of revenue difference from a first altered request, the second version may still be a marked increase over the base revenue. The differences between base revenue and various versions of altered requests can be fed to the optimization engine 116 as a measurement of the increase or decrease in effectiveness of the optimization engine 116. Fees based on the base revenue can be paid to the supplier 114 according to a supplier agreement. The additional optimizing revenue can be paid to the service provider for producing more efficient advertising.

As described above, the optimization engine 116 may submit a request multiple times in order to get the desired number of advertisements. In one embodiment, the advertisements are expected within an allotted time period, for example, under one second, to ensure that a user can quickly view the advertisements. Referencing back to FIG. 1, routing system 104 includes a clocking module 132 to monitor the processing time for requests.

Clocking module 132 typically uses a total response time, for example one second, to monitor the time in which computer system 100 and suppliers 114 are required to return advertisements to a user. The total response time ($T_{tot}$) can include the time required to preprocess a request ($T_{pre}$) (such as performing optimization and altering a request), the time required to send the request or altered request to the supplier 114 and receive advertisements from the suppliers ($T_{fetch}$), and the time required to post process a request or altered request ($T_{post}$), including receiving the advertisements from the suppliers and sending the advertisements to the requester 102. Thus, the fetching period equates to $T_{fetch}=T_{tot}-T_{pre}-T_{post}$.

Embodiments of the present invention provide several methods to ensure that a advertisements are returned within the allotted time constraint. For example, the fetching period ($T_{fetch}$) can be divided into a first fetching period and a second fetching period. The suppliers 114 can be given the first fetching period to respond to a request. If one or more suppliers 114 do not provide advertisements within the first fetching period, a backfill module 134 at the routing system 104 can request backfill advertisements during the second fetching period. The supplier 114 may not return the requested number of advertisements because the supplier is unavailable or the response is too slow.

The backfill advertisements are preferably related to the keywords in the request or altered request, but this is not required if a timely response is more important than optimizing the advertisements. Backfill advertisements can be obtained in a number of different ways. In one embodiment, backfill module 134 can send another request (i.e., a backfill request) during the second fetching period to the same supplier 114 with different keyword(s) than used in the first request or altered request.

In another embodiment, the backfill module 134 may send a backfill request to a different supplier 114 using the same keyword(s). Note that in embodiments where simultaneous requests are being sent in parallel to more than one supplier, the keywords used for both suppliers 114 may be the same. In this event, one of the suppliers 114 may return more than the requested number of advertisements and the backfill module 134 may use the extra advertisements to fill the empty slots without having to send a backfill request to any other suppliers 114.

In yet another embodiment, backfill module 134 may send a backfill request to a different supplier 114 using a different keyword. Note that in embodiments where simultaneous requests are being sent in parallel to more than one supplier 114, the keywords used for both suppliers may be different. In this event, one of the suppliers may return more than the requested number of advertisements and the backfill module 134 may use the extra advertisements to fill the empty slots without having to send a backfill request to any more suppliers 114.

In yet another embodiment, the backfill module 134 includes a trigger condition that identifies the point at which a certain action should happen. The trigger condition can be used to trigger any potential behavior in the second fetching period. For example, if the trigger condition for a certain supplier requires that a supplier 114 return at least 75% of the requested advertisements before performing a backfill request, and that supplier returns 9 out of 10 advertisements, the backfill module 134 will not perform a backfill request. However, if the supplier only returns 7 out of 10 advertisements, the backfill module 134 will perform a backfill request using any of the different variations of forming a backfill request described above.

The trigger condition can be defined to be any condition desired. For example, the trigger condition may define that in all cases, the number of advertisements returned must match the number of advertisements requested, otherwise, a backfill request must be performed. The trigger condition can also be combined with the response time for obtaining advertisements. For example, the trigger condition may define to perform a backfill request, but only if it can occur within the total response time. Or, alternatively, the trigger condition may alter the total response time if obtaining backfill advertisements is a higher priority. For example, the trigger condition may define that at least 75% of the advertisements must be returned, otherwise, in all cases, a backfill request is performed with an additional 0.5 seconds given to perform the backfill request, returning to the requester 102 whatever advertisements are obtained within the additional 0.5 seconds.

Finally, another backfill method includes storing a number of stock backfill advertisements at administrative system 124 which the backfill module 134 can access instead of or in addition to the backfill requests described above. For example, the trigger condition can provide an additional amount of time to perform the backfill request. If the backfill request takes too much time, the backfill module 134 may retrieve the desired number of stock backfill advertisements from administrative system 124 and return those with the other advertisements. Alternatively, the backfill module 134 may go directly to the stock backfill advertisements in administrative system 124 instead of performing a backfill request, for example, where time is of the essence.

Figure 5:
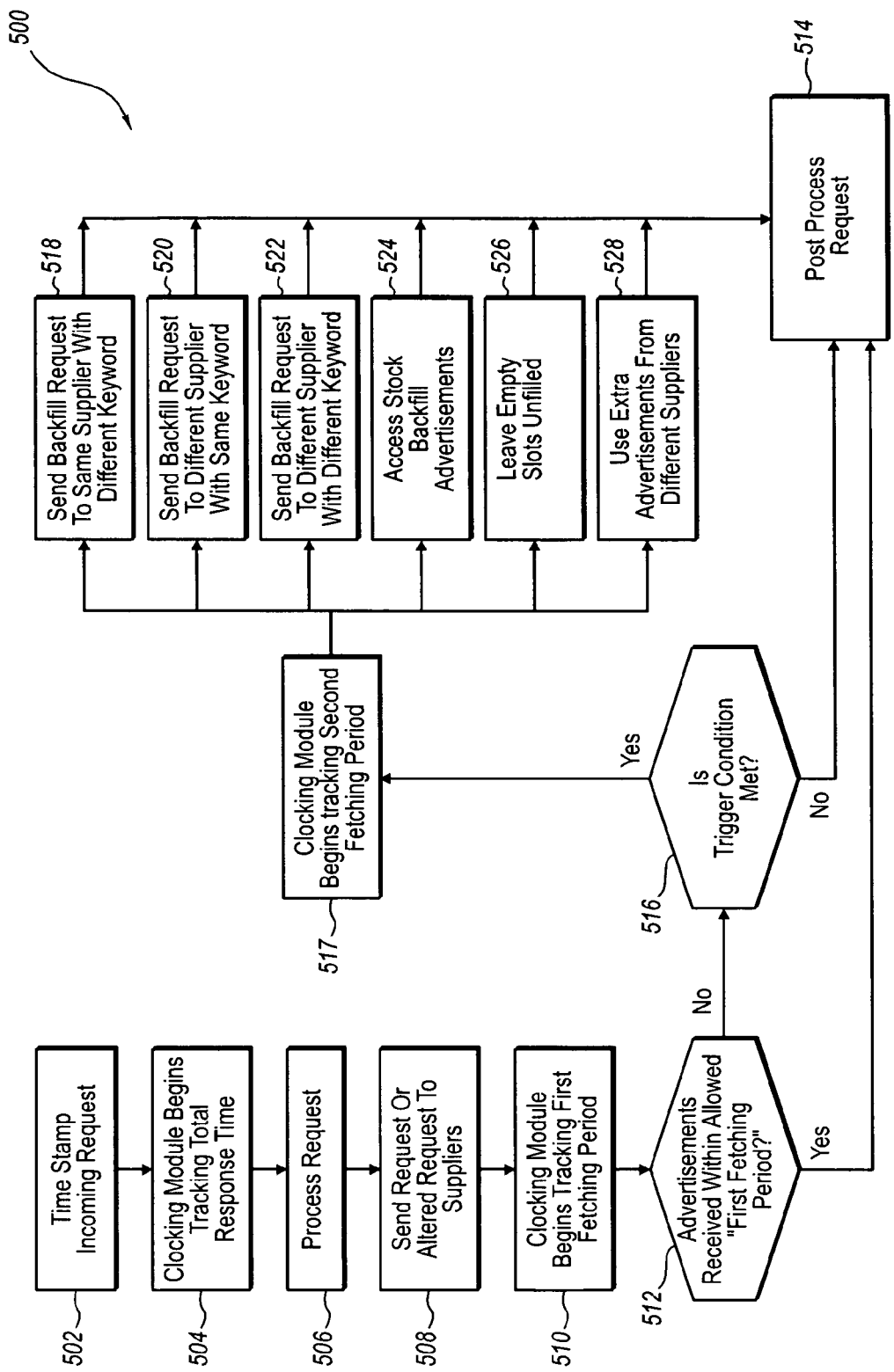
FIG. 5 illustrates an exemplary method for using a clocking module and a backfill module according to aspects of one embodiment of the present invention.

FIG. 5 illustrates an exemplary method 500 for performing the clocking and backfill functions controlled by clocking module 132 and backfill module 134. It will be appreciated that some of the stages of method 500 can be modified, performed in a different order, eliminated, and that additional stages may be added. The method 500 may be practiced, for example, in the embodiments of the computing system described herein. Thus, the description of the stages of method 500 will be described in the context of system 100, realizing that other systems may be used to perform the stages thereof. Furthermore, the methodology for ensuring response within the allotted response time can apply to other forms of content other than advertisements.

At 502, routing system 104 identifies an incoming request from a requester 102 and assigns the request with a timestamp. At 504, the clocking module 132 begins tracking the total response time to return a response to the requester 102.

At 506, clocking module 132 beings tracking the preprocessing period which may include the routing system 104 evaluating the request to determine if the request needs to be altered with optimization parameters. This may be as simple as identifying an optimization profile that corresponds to similarly-situated requests. If the request is to be optimized, the request is sent to optimization engine 116. Optimization engine 116 evaluates the request, accesses the necessary information from reporting system 128 and/or other sources, and formulates an optimized profile based on the various optimization methods described above. Routing system 104 alters the request using the optimized profile and sends the altered request to one or more suppliers 114 in parallel. This can include routing the request to a task queue for each supplier 114.

At 508, routing module 104 sends the request or altered request to the supplier 114. At 510, clocking module 132 begins monitoring a first fetching period in which advertisements should be received from each of the suppliers 114.

At 512, the backfill module 134 determines if the requested number of advertisements was received in the first fetching period. If the desired number of advertisements were received, at 514, the routing system 104 performs post processing of the request, including sending the advertisements to the requester 102. The clocking module 132 then notes the final response time and concludes monitoring this transaction.

If the desired number of advertisements were not received from any one of the suppliers 114, at 516, backfill module 134 determines whether a trigger condition has been met. At 520, if a trigger condition has not been met, then the process proceeds to 514 for post processing of the request. The clocking module 132 then notes the final response time and concludes monitoring this transaction.

If the trigger condition has been met, at 517, then clocking module 132 begins monitoring a second fetching period in which the backfill module 134 may obtain backfill advertisements. The backfill module 134 may make any of various choices. At 518, backfill module 134 could send a backfill request to the same supplier using different keywords. At 520, backfill module 134 could send a backfill request to a different supplier using the same keywords. At 522, backfill module 134 could send a backfill request to a different supplier with different keywords. Backfill module 134 could send a backfill request based on any of 518, 520 or 522 based on optimizing factors such as, but not limited to, demographic, location, and/or past searching information to further target or optimize the advertisements. At 524, if the backfill module 134 decides not to perform 518, 520 or 522 or in addition to these, the backfill module 134 may access administrative system 134 to obtain backfill advertisements to fill empty slots in the blending instructions. At 526, backfill module 134 could leave the empty slots unfilled and return the advertisements in the filled slots. At 528, backfill module 134 could also use extra advertisements returned from other suppliers 114 without performing an additional backfill request. Any of these mechanisms for providing backfill can implement any of the optimizing methods described herein.

Depending on how the backfill module 134 proceeds, at 514, the routing system 104 performs postprocessing of the request which includes sending the advertisements to the requester 102 which concludes the monitoring of the transaction. Optionally, the routing system 104 may inform the requestor which advertisements were supplied by a backfill mechanism.

Thus, independent of the response time of a particular supplier 114, the routing system 104 guarantees some advertisement. One embodiment of the present invention thus provides a method for ensuring timely receipt of advertisements in response to an advertisement request, the method including: identifying a base request from an advertisement requester (502); identifying a total response time allowed to process the base request, wherein the total response time allowed includes (504): a preprocessing period before the base request is sent to an advertisement supplier (506); a fetch period to send the request to the advertisement supplier and receive advertisements from the advertisement supplier (510); and a postprocessing period to process the advertisements obtained from the advertisement supplier and send the advertisements to the advertisement requester (514); and monitoring the processing of the base request to determine whether the advertisements are received and sent to the advertisement requester within the total response time allowed (504).

In another embodiment, there is a method for dynamically backfilling a deficient number of advertisements from an advertisement supplier, the method including: identifying a first request from an advertisement requester, the first request identifying a desired number of advertisements to receive from a first advertisement supplier (502); identifying a first fetching period (510); sending the first request to the first advertisement supplier (508); monitoring to determine whether the desired number of advertisements from the first advertisement supplier are received within the first fetching period (512); if the desired number of advertisements are not received within the first fetching period, performing a backfill mechanism (518 through 528) to supply the desired number of advertisements. Backfill mechanisms can include at least one of: sending a second request to the first advertisement supplier within a second fetching period using a different keyword than used in the first request (518); sending a first request to a second advertisement supplier within a second fetching period using the same keyword as used in the first request (520); sending a first request to a second advertisement supplier within a second fetching period using a different keyword than used in the first request (522); accessing a database of stock backfill advertisements and selecting one or more stock backfill advertisements within a second fetching period (524); or selecting one or more extra advertisements received from a second advertisement supplier during the first fetching period (528).

Yet another embodiment for backfilling a deficient number of advertisements from an advertisement supplier is a method including: identifying a first request from an advertisement requester, the first request identifying a desired number of advertisements to receive from a first advertisement supplier (502); identifying a first fetching period (510); sending the first request to the first advertisement supplier (508); monitoring to determine whether the desired number of advertisements from the first advertisement supplier are received within the first fetching period (512); if the desired number of advertisements are not received within the first fetching period, determining whether a trigger condition is met (516); and if the trigger condition is met, identifying one or more advertisements from a backfill advertisement source within a second fetching period (518, 520, 522, 524, 526, 528).

Aspects of the administrative system 124 will now be described in further detail. Administrative system 124 includes a preference system 126 that allows the service provider administrator, requesters 102, and/or suppliers 114 to define their preferences. In one embodiment, the user interface of the administrative system provides screens, fields, drop-down boxes, wizards, or popup screens, or other input mechanisms, that allow an administrator, requester 102, or supplier 114 to specify various configurations.

Figure 6:
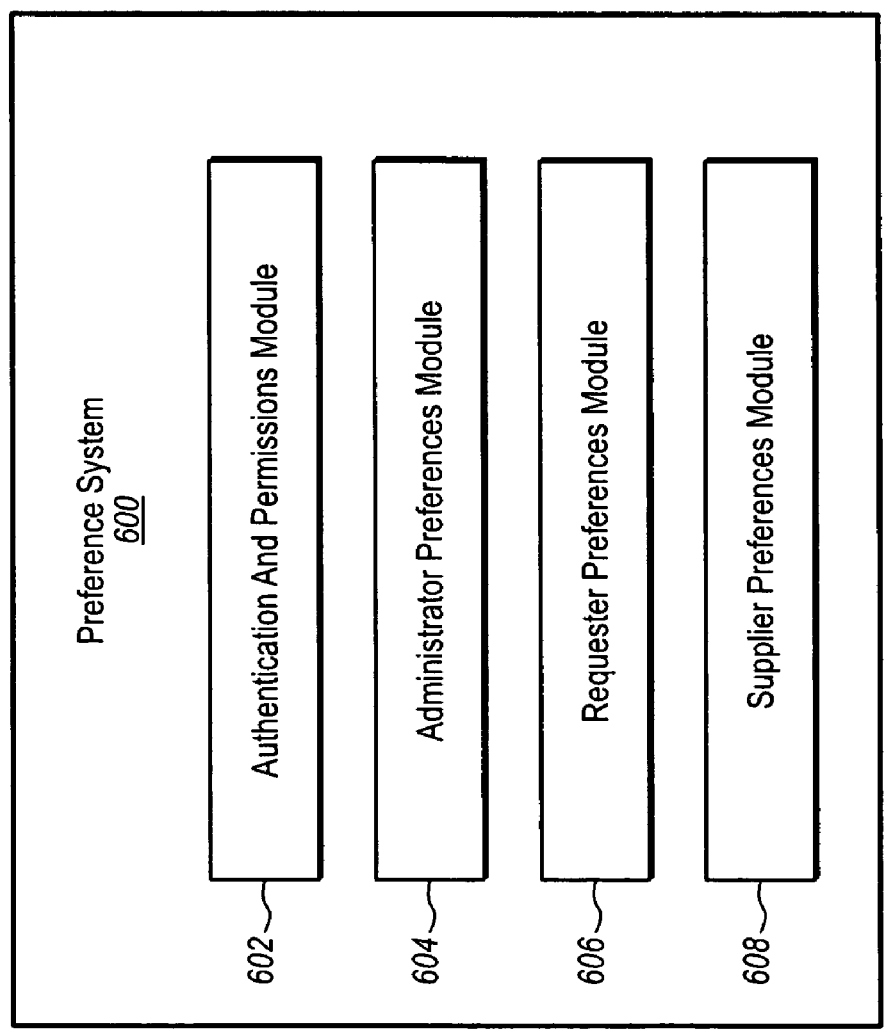
FIG. 6 illustrates an exemplary administrative system according to aspects of one embodiment of the present invention.

An exemplary preference system 600 is illustrated in FIG. 6. Preference system 600 can include authentication and permissions module 602 that require any entity accessing the preference system 600 to first authenticate. The authentication and permissions module 602 may also control access, viewing, modification, and approval of changes to the configurations stored in configuration database 144.

An administrator preferences module 604 is provided to allow an administrator to create channel profiles, administrative overrides, block lists, stock backfill advertisement, safe configurations and web offers. When a request is received from a requester 102 for the first time, the requester 102 is assigned a Channel ID and a Sub-channel ID. This is maintained in a channel profile and is used to maintain subsequent information (such as channel request preferences, block lists, etc.) relating to that requester.

Administrative overrides, described in more detail below, prevent a malformed request from producing errors. The overrides provide parameter values for a number of predetermined error conditions.

Block lists can help bolster parental control standards as well as other reasons for filtering keywords or content. The block lists can filter requests using keyword block list filters. In addition, the block list module can filter advertisements using phrase block list filters and domain block list filters. For example, if there is a certain exclusivity agreement, certain domain names may be blocked from being used as advertisements.

Stock backfill advertisement can be added to configuration database 144 to provide a ready resource of advertisements should a supplier 114 fail to respond with requested advertisements.

Safe configurations allows the service provider administrator to configure new system configurations, but is able to configure them in such a way as to protect other system components, as will be described in further detail below.

Preference system 600 also includes a requester preferences module 606 that allows a requester 102 to create, alter, or delete request preferences, response preferences, keyword overrides, block lists, optimization factors, blending instruction management, and the like. Preference system 600 further includes a supplier preference module 608 that allows a supplier 114 to create, alter, or delete request preferences.

In one embodiment of the invention, the administrative system 124 provides an override tool that prevents faulty requests from affecting the advertisements. For example, one parameter that can be included in a request is a testing parameter. If the request is really not a test, the advertisement system has the ability to override the testing parameter to convert it to false instead of true. Thus, the administrative system 124 has the ability to configure the requests in real-time. This can be especially beneficial where it may take a requester 102 weeks or months to make the changes to make the request responses operable. The administrative system can perform real-time changes to the requests until the requester fixes its problems.

Figure 7:
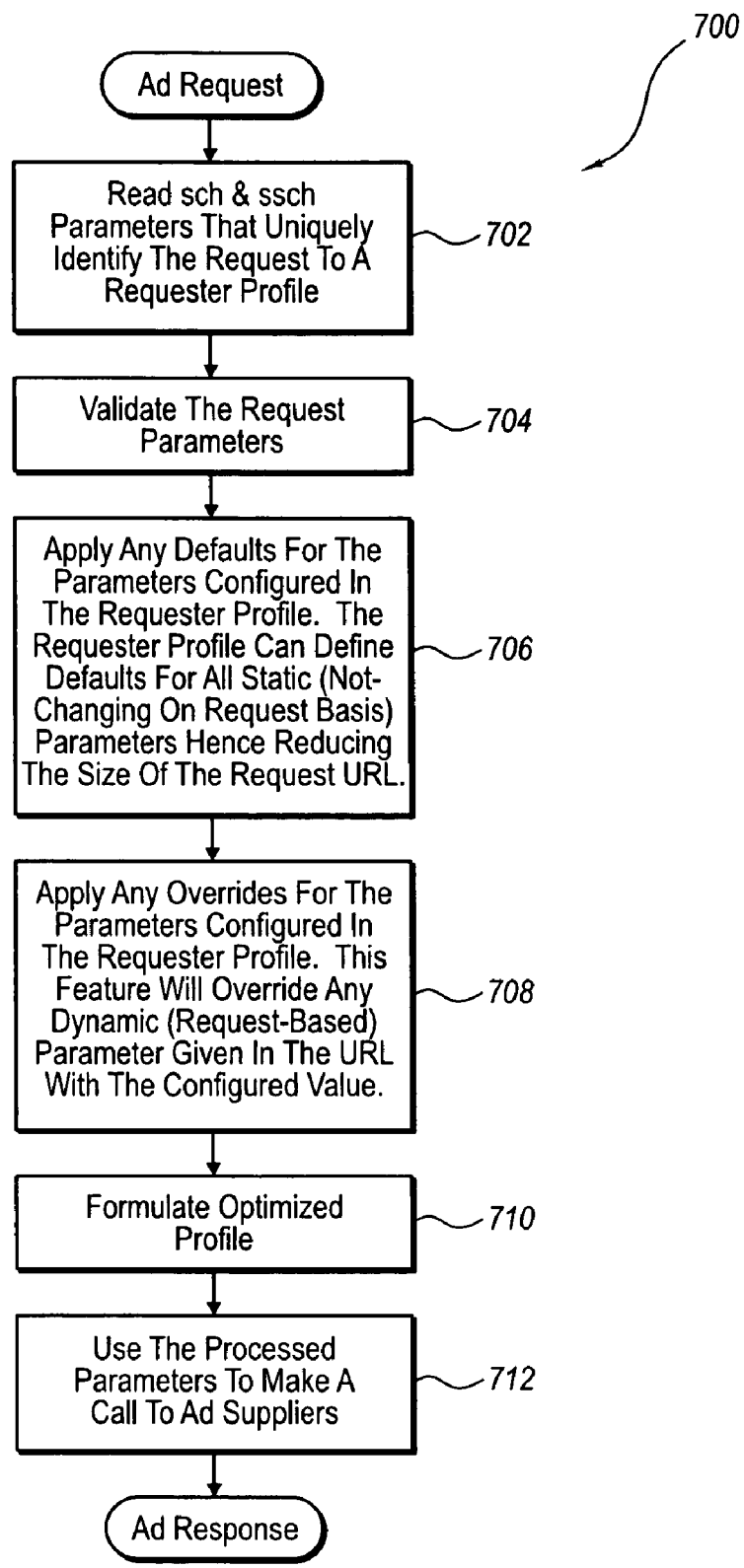
FIG. 7 illustrates an exemplary method for performing keyword overrides according to aspects of one embodiment of the present invention.

FIG. 7 illustrates an exemplary method 700 for performing an override of request parameters. It will be appreciated that some of the stages of method 700 can be modified, performed in a different order, eliminated, and that additional stages may be added. The method 700 may be practiced, for example, in the embodiments of the computing system described herein. Thus, the description of the stages of method 700 will be described in the context of system 100, realizing that other systems may be used to perform the stages thereof.

At 702, the routing system 104 identifies a request and reads the channel ID and sub-channel ID parameters that uniquely identify the requester 102. At 704, the routing system 104 validates the request parameters. At 706, the routing system 104 may access preferences to modify the request. This includes adding any defaults for the parameters identified in the channel request preference.

At 708, the routing system 104 applies any overrides for the parameters configured by the administrative preferences 604, requester preferences 606 and/or supplier preferences 608. This dynamically overrides any faulty parameters in the request with the override value.

At 710, the request parameters are sent to the optimization engine 116 to formulate an optimized profile for the request. At 712, the optimized profile is returned to the routing system 104 to enable the routing system 104 to alter the request to form an altered request, which is sent to the suppliers 114.

While routing system 104, optimization engine 116 and administrative system 124 can be configured as separate components, and can be operating on different pieces of hardware—e.g., each can be located on a different server, it is also possible for these elements to all be operating on the same computing system or server, as depicted by shadowed box 152. In embodiments where the routing system 104, optimization engine 116, and/or administrative system 124 reside on different servers, the present invention provides a safety configuration to allow secure creation of system configurations. The safety configuration also allows various components of the system to start up or continue to function even when poor configurations are created.

Referring back to FIG. 1, administrative system 124 includes a configuration tool 142 that allows an administrator to generate and store new configurations for various components of the system 100. Administrative system 124 also includes a configuration database 144 that stores new system configurations. Each component in the system that accesses the configuration database 144 to obtain new system configurations can include a safety configuration module 146 that obtains new configurations for that component and ensures that new configurations are safe for that component.

The need for the safety configuration module 146 is illustrated in the following example: Suppose there are thirty routing systems 104 in system 100. The thirty routing systems 104 need to be aware of any changes in the configuration. However, when an administrator changes a configuration using safety configuration module 146 and makes an error in the configuration, that error should not be propagated to all thirty routing systems 104. So the safety configuration module 146 includes a local memory 150 and a file system 148, each of which keep the valid configuration stored therein.

The safety configuration module 146 sends requests for new configurations to configuration database 144 at the administrative system 124. If the new configuration is a valid configuration, then the safety configuration module 146 fetches the new valid configuration, overwrites old configurations with the new valid configuration in the file system 148 and local memory 150 and starts operating from the new valid configuration. However, if the new configuration is faulty, the safety configuration module 146 keeps the faulty configuration from being propagated to that component and the routing system 104 continues to operate off of the previous valid configuration.

Figure 8A:
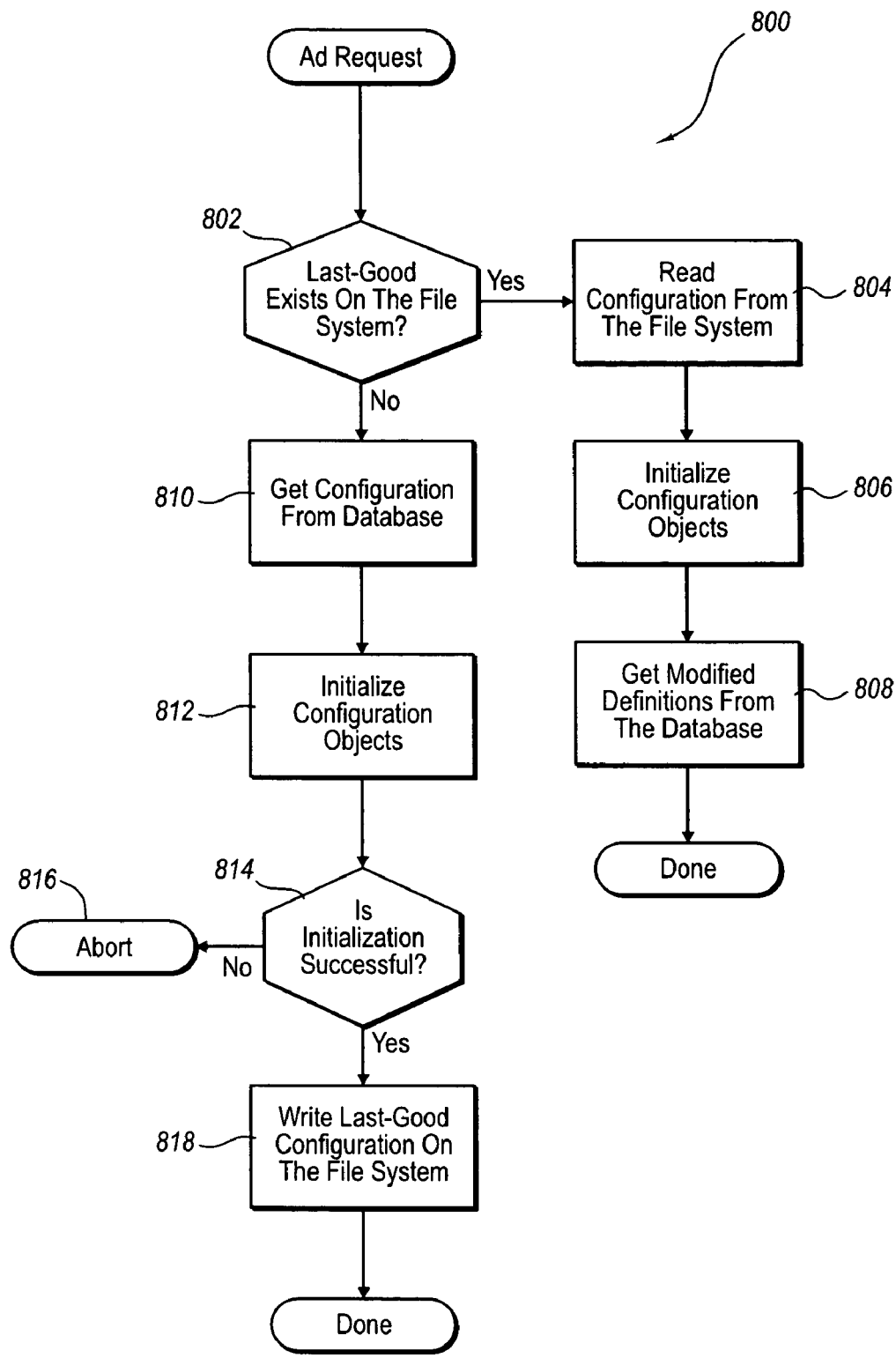
FIG. 8A through 8C illustrate an exemplary method for performing safe system configurations according to aspects of one embodiment of the present invention.
Figure 8B:
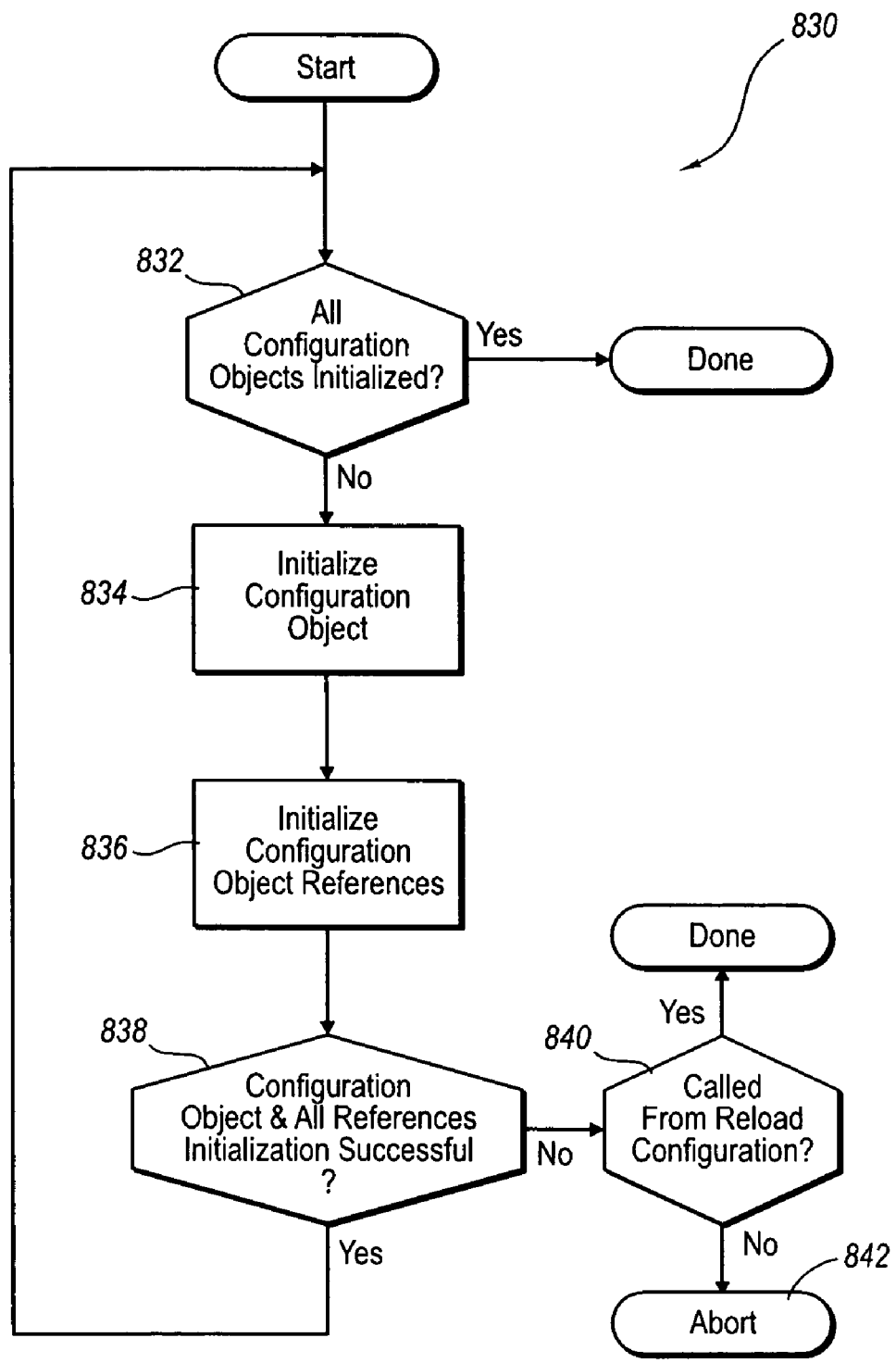
Figure 8C:
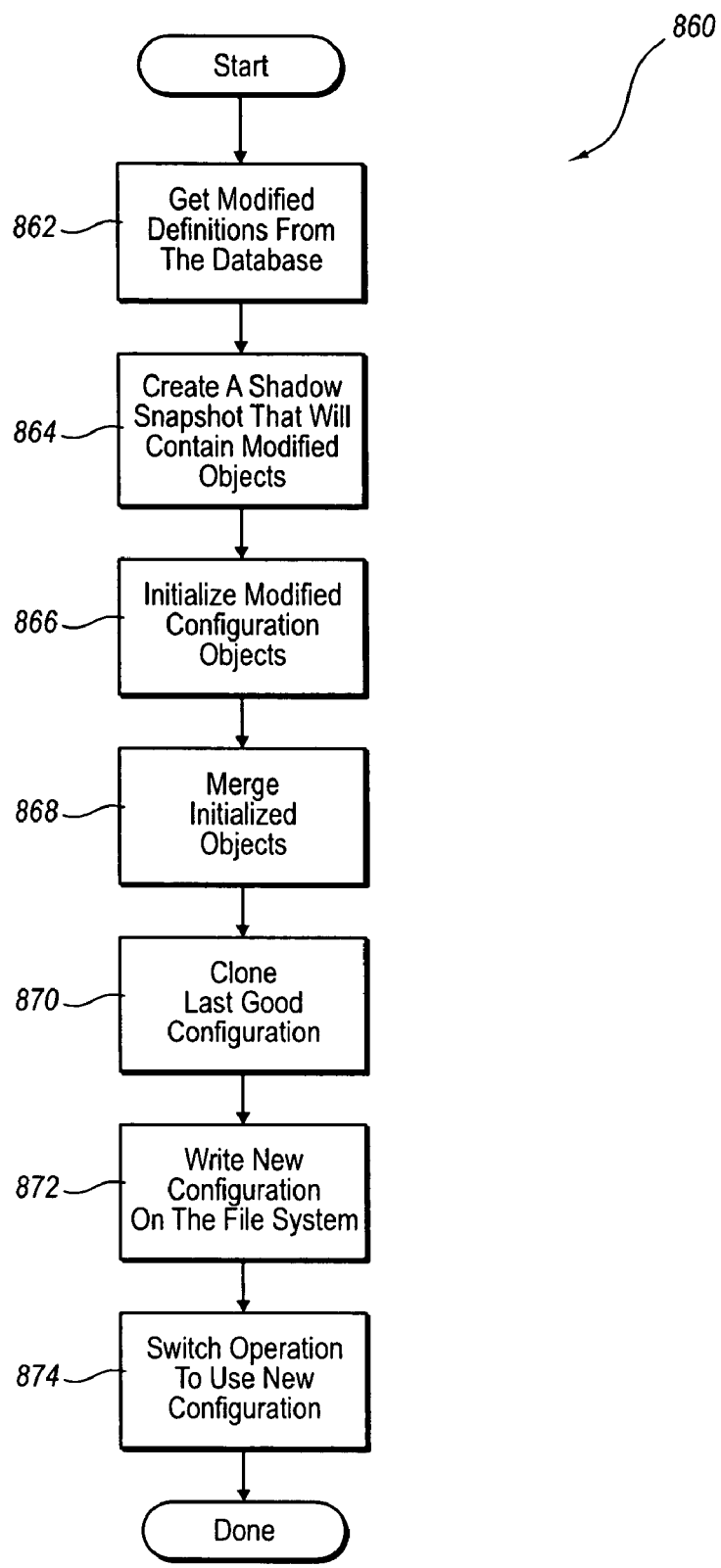

FIGS. 8A through 8C illustrate various methodology that a system may use to implement the safety configuration. The first time that the local component (e.g., routing system 104) starts up, safety configuration module 146 reads the necessary configurations stored in configuration database 144 into the file system 148 on the local component so that the local component is decoupled from the configuration database 144. So if the administrative system 124 holding the configuration database 144 were to malfunction for some reason, a local copy is still accessible on the local component.

FIG. 8A illustrates a method 800 depicting the initializing phase. At 802, safety configuration module 146 determines whether the last good configuration exists on the file system 148. At 804, if the last good configuration does exist, the last good configuration is read from the file system 148. At 806, safety configuration module 146 initializes the configuration objects. At 808, safety configuration module 146 retrieves modified definitions from the configuration database 144 and applies it to the configuration repository as illustrated in FIG. 8C.

At 810, if the last good configuration is not on the file system 148, safety at configuration module 146 retrieves the last good configuration from the configuration database 144. At 812, safety configuration module 146 initializes the configuration objects. At 814, safety configuration module 146 determines whether the initialization was successful. At 816, if the initialization was not successful, then safety configuration module 146 aborts the initialization. At 818, if the initialization is successful, then safety configuration module 146 writes the last good configuration onto the file system 148.

FIG. 8B illustrates a method 830 depicting the initializing of configuration objects in further detail. At 832, safety configuration module 146 determines whether all configuration objects are initialized. At 834, if all the configuration objects are not initialized, then safety configuration module 146 proceeds with initializing configuration objects. At 836, safety configuration module 146 initializes configuration object references.

At 838, safety configuration module 146 determines whether initializing of all configuration objects and configuration object references was successful. If the initialization of all configuration objects and configuration object references is successful, safety configuration module 146 returns to 832. At 840, if the initialization of configuration objects and configuration object references is not successful, then safety configuration module 146 determines whether the configuration objects and configuration object references were called while loading a new configuration onto the local component. At 842, if the configuration objects and configuration object references were called while loading a new configuration, then safety configuration module 146 aborts initializing of configuration objects.

FIG. 8C illustrates a method 860 depicting the loading of a new configuration onto the local component in further detail. At 862, safety configuration module 146 gets modified definitions from the configuration database 144. At 864, safety configuration module 146 creates a shadow snapshot in memory 150 that will contain modified objects. At 866, safety configuration module 146 initializes modified configuration objects in memory 150 using the shadow snapshot. At 868, safety configuration module 146 merges initialized objects into the cloned configuration snapshot. At 870, safety configuration module 146 clones the last good configuration and stores it in memory 150. At 872, safety configuration module 146 writes the new configuration on the file system 148, overwriting the last good configuration. At 874, safety configuration module 146 switches operation to use the new configuration snapshot instead of the last good configuration.

Thus, during configuration of any part of the system, the system is running on the old configuration until a new configuration is validated. The new configuration is stored in memory with the old configuration. When the new configuration is validated, the old configuration in the file system is overwritten with the new configuration. The benefit of this is that at next startup, if the link to configuration database 144 is broken, then the local component can restart from the file system 148 using a valid configuration in all cases. That is, the configuration database 144 can be decoupled from other components of the system 100. If the configuration database 144 crashes or contains a faulty configuration, the operation of the other components is not affected. Reasons for a faulty configuration can include anything from database problems, accidental deletion of data, and the like. While the safety configuration module 146 and configuration tool 142 are described in the context of the advertising system 100, it will be appreciated that this configuration can generically be applied to other systems which desire secure configurations.

Finally, when an advertisement response is returned to the requester 102, the response can include various parameters (see Table 3). In addition to the parameters listed in Table 3, the response may also include information about any of the optimization methods described herein. For example, some requesters may use the optimization information to determine where the advertisements should be displayed on a user interface. Some areas in the user interface display may be considered to have higher value than others (e.g., the top of the display may be considered higher value real estate than the bottom of the display).

In one embodiment, the response module 117 of the routing system 104 can calculate a quality score associated with the advertisement response to provide the requester 102 with an indication of the value of the advertisement response. In a further embodiment, the response module 117 may assign an overall quality score and sub-scores to individual advertisements. The response quality score can be based on various factors such as, but not limited to, the user response history associated with the advertisements in the response, the click-through-rate (CTR), the cost-per-click (CPC), the ad response percentage (ARP), the call response ratio, or views of advertisements included in the response. Furthermore, the quality score can identify which of the advertisements in the response were obtained using a backfill mechanism.

The requester 102 can use the quality score to determine on which part of the user interface to display the advertisements. Where a sub-score is provided, a requester 102 may divide the advertisements provided in the response and display some having a higher quality sub-score in a higher-valued area of the user interface and display others having a lower quality sub-score in a lower-valued area.

Figure 9:
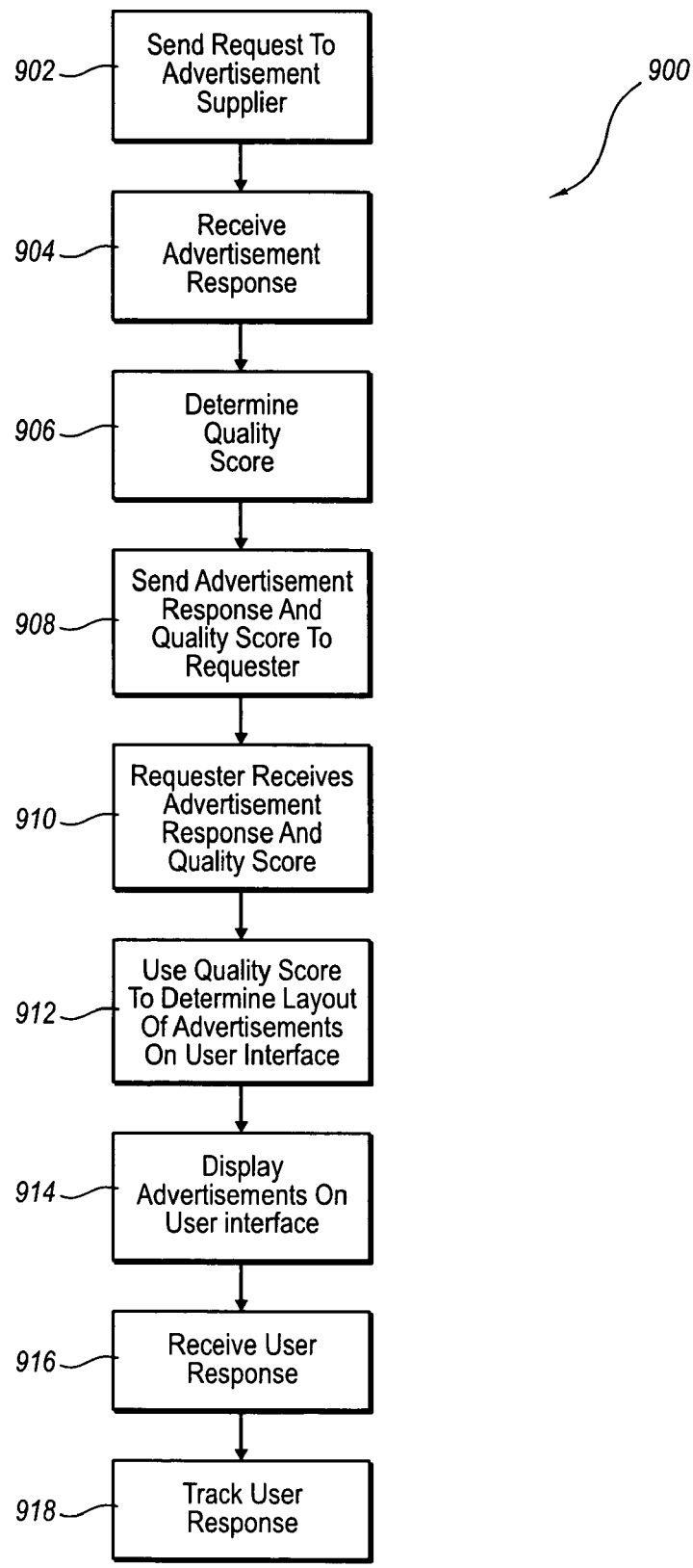
FIG. 9 illustrates an exemplary method for providing and using a quality score with the serving of advertisements to determine a page layout according to aspects of one embodiment of the present invention.

FIG. 9 illustrates an exemplary method 900 for using a quality score to determine where on a user interface an advertisement response can be displayed. It will be appreciated that some of the stages of method 900 can be modified, performed in a different order, eliminated, and that additional stages may be added. The method 900 may be practiced, for example, in the embodiments of the computing system described herein. Thus, the description of the stages of method 900 will be described in the context of system 100, realizing that other systems may be used to perform the stages thereof.

At 902, the routing system 104 identifies a request (can be a base request or altered request) and sends the request to an advertisement supplier. Thus, the request can undergo any of the optimization methods described herein. At 904, the routing system 104 receives an advertisement response from the advertisement supplier.

At 906, the response module 117 evaluates the advertisement response to determine a quality score associated with the advertisement response. This can include determining one or more quality sub-scores associated with each advertisement in the advertisement response. As mentioned above, the quality score can be based on, but is not limited to, the click-through-rate (CTR), cost-per-click (CPC), ad response percentage (ARP), call response ratio, or views of the advertisements in the advertisement response. The quality score can further identify which of any of the advertisements were obtained using a backfill mechanism.

At 908, the routing module 104 sends the quality score with the advertisement response to an advertisement requester. At 910, the advertisement requester 102 receives the advertisement response and evaluates the advertisement response to identify the quality score associated with the advertisement response.

At 912, the advertisement requester 102 uses the quality score to determine where to display at least a portion of the advertisement response on a user interface. This can include identifying a high-value area of the user interface and determining whether the quality score meets a threshold value to be able to display one or more advertisements in the high-value area of the user interface. Where a quality sub-score is provided, the advertisement requester 102 may divide the advertisements in the advertisement response and display the advertisements in separate areas of the user interface.

At 914, the requester 102 displays the advertisements on the user interface according to the quality score. At 916, the user may respond to one or more of the advertisements by, e.g., clicking on the advertisement, making a phone call in response to the advertisement, making a purchase in response to the advertisement, and the like. At 918, the routing system 104 tracks user response to the advertisements.

Thus, in one embodiment, the present invention provides a method for providing a quality score associated with an advertisement response to be used to assist in determining the display of the advertisement response on a user interface, the method including: identifying a first request (902); sending the first request to at least one advertisement supplier (902); receiving an advertisement response including at least one advertisement (904); evaluating the advertisement response to determine a quality score associated with the advertisement response (906); and sending the quality score with the advertisement response to an advertisement requester (908).

In another embodiment, the present invention provides a method for using a quality score to determine where to display one or more advertisements on a user interface, the method including: receiving a response to an advertisement request, the response including at least one advertisement (910); evaluating the advertisement response to identify a quality score associated with the advertisement response (912); and using the quality score to determine where to display at least a portion of the advertisement response on a user interface (912).

The present invention can be applied to various user services that desire to provide optimized advertising. For example, applications include calendaring, bookmarks, alerts, email, instant messaging, chatrooms, polling, RSS feeds, blogs, and the like. In the context of the present invention, these types of services can be considered to be various requesters and can generate requests that can tap into the features of the present invention. Beneficially, the present invention can provide these services with more relevant advertisements, easy integration into the present invention, better reporting on revenue generation, and the like.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
by one or more computers:
identifying a base request from an advertisement requester, the base request including a set of one or more search terms;
identifying a first keyword and a second keyword associated with the base request;
associating the first and second keywords with at least two demographic-based criteria bins;
within each demographic-based criteria bin that is associated with the first and second keywords, ranking the first keyword and the second keyword based on a user response history associated with the first keyword and the second keyword;
applying weights to the demographic-based criteria bins; and
based on the weights applied to the demographic-based criteria bins, selecting at least one of the demographic-based criteria bins and selecting, from each selected demographic-based criteria bin, the higher ranked of the first keyword and the second keyword for use in dynamically altering the set of one or more search terms of the base request.

2. The method as recited in claim 1, wherein identifying a first keyword and a second keyword associated with the base request comprises identifying the first keyword and the second keyword based on at least one of:
the content of the base request based on at least one of:
identifying search terms in the base request;
crawling the content of a URL identified in the base request; or
identifying content in a content, category or hint parameter included with the base request; or
factors that may or may not be related to the content of the base request based on at least one of:
synonyms to content in the base request;
relevancy to the content of the base request;
current popular keywords for a given day;
historically popular keywords for a given day;
the time of day;
the time of week; or
the context of the base request based on at least one of:
identifying trends;
identifying system requirements of a user;
identifying the time and date of the base request;
identifying past user search history; or
identifying user demographics.

3. The method as recited in claim 1, wherein identifying a first keyword and a second keyword associated with the base request comprises identifying that the first keyword and the second keyword is undesirable based on at least one of:
adult controls;
predetermined offensive material; or
an exclusivity requirement.

4. The method as recited in claim 1, wherein ranking the first keyword and the second keyword based on a user response history associated with the first keyword and the second keyword is based on at least one of:
- click-through-rate (CTR) of advertisements obtained using each of the first keyword and the second keyword;
- cost-per-click (CPC) of advertisements obtained using each of the first keyword and the second keyword;
- ad response percentage (ARP) of advertisements obtained using each of the first keyword and the second keyword;
- call response ratio obtained using each of the first keyword and the second keyword; or
- views obtained using each of the first keyword and the second keyword.

5. A method comprising:
by one or more computers:
- identifying a base request from an advertisement requester, the base request including a set of one or more search terms;
- identifying a first keyword and a second keyword associated with the base request;
- associating the first and second keywords with at least two demographic-based criteria bins;
- within each demographic-based criteria bin that is associated with the first and second keywords, ranking the first keyword and the second keyword based on a user response history for each keyword;
- applying weights to the demographic-based criteria bins;
- based on the weights applied to the demographic-based criteria bins, selecting at least one of the demographic-based criteria bins and selecting, from each demographic-based selected criteria bin, the higher ranked of the first keyword and the second keyword;
- dynamically altering the set of one or more search terms of the base request to include the higher ranked of the first keyword and the second keyword from each selected demographic-based criteria bin to form an altered request;
- sending the altered request to an advertisement supplier;
- receiving at least one advertisement from the advertisement supplier in response to the altered request;
- sending the at least one advertisement to the advertisement requester; and
- tracking user response to the at least one advertisement.

6. The method as recited in claim 5, wherein tracking user response to the at least one advertisement further comprises associating the user response with the higher ranked of the first keyword and the second keyword.

7. The method as recited in claim 5, wherein tracking user response to the at least one advertisement further comprises evaluating whether increased user response was obtained using the altered request.

8. The method as recited in claim 5, wherein identifying a first keyword and a second keyword associated with the base request comprises identifying the first keyword and the second keyword based on at least one of:
- the content of the base request based on at least one of:
  - identifying search terms in the base request;
  - crawling the content of a URL identified in the base request; or
  - identifying content in a content, category or hint parameter included with the base request; or
- factors that may or may not be related to the content of the base request based on at least one of:
  - synonyms to content in the base request;
  - relevancy to the content of the base request;
  - current popular keywords for a given day;
  - historically popular keywords for a given day;
  - the time of day;
  - the time of week; or
  - the context of the base request based on at least one of:
    - identifying trends;
    - identifying system requirements of a user;
    - identifying the time and date of the base request;
    - identifying past user search history; or
    - identifying user demographics.

9. The method as recited in claim 5, wherein ranking the first keyword and the second keyword based on a user response history for each keyword is performed according to at least one of:
- click-through-rate (CTR) of advertisements obtained using each of the first keyword and the second keyword;
- cost-per-click (CPC) of advertisements obtained using each of the first keyword and the second keyword;
- ad response percentage (ARP) of advertisements obtained using each of the first keyword and the second keyword;
- call response ratio obtained using each of the first keyword and the second keyword; or
- views obtained using each of the first keyword and the second keyword.

10. A system comprising:
one or more servers including an optimization engine configured to:
- identify a base request from an advertisement requester, the base request including a set of one or more search terms;
- identify a first keyword and a second keyword associated with the base request;
- associating the first and second keywords with at least two demographic-based criteria bins;
- within each demographic-based criteria bin that is associated with the first and second keywords, identify a user response history associated with the first keyword and the second keyword;
- within each demographic-based criteria bin that is associated with the first and second keywords, rank the first keyword and the second keyword based on the user response history;
- applying weights to the demographic-based criteria bins; and
- based on the weights applied to the demographic-based criteria bins, selecting at least one of the demographic-based criteria bins and selecting, from each selected demographic-based criteria bin, the higher ranked of the first keyword and the second keyword; and one or more servers including a routing system communicating with an advertisement requester and an advertisement supplier, the routing system also communicating with the optimization engine, the routing system configured to:
- dynamically alter the set of one or more search terms of the base request to include the higher ranked of the first keyword and the second keyword from each selected demographic-based criteria bin to form an altered request; and
- send the altered request to an advertisement supplier.

11. The system as recited in claim 10, wherein the optimization engine further comprises at least one of:
- a keyword extractor configured to identify a first keyword and a second keyword related to the content of the base request;
- a related keyword processor configured to identify a first keyword and a second keyword that is not necessarily related to the content of the base request; or a keyword filter configured to identify that a first keyword and a second keyword is undesirable.

12. The system as recited in claim 11, wherein the keyword extractor is further configured to rank the identified a first keyword and a second keyword into a rank/density listing.

13. The system as recited in claim 10, wherein the routing system is further configured to:
   receive at least one advertisement from the advertisement supplier;
   send the at least one advertisement to the advertisement requester; and
   track user response to the at least one advertisement.

14. The system as recited in claim 13, wherein the routing system being configured to track user response further comprises at least one of:
   an advertisement request log;
   an advertisement click log; or
   an advertisement return log.

15. The system as recited in claim 10, wherein the routing system further comprises at least one of:
   a request module configured to analyze the base request; or
   a response module configured to analyze advertisements received from the advertisement supplier.

16. The system as recited in claim 10, further comprising an administrative system comprising:
   a preference system configured to allow the advertisement requester, the advertisement supplier, or an administrator to preconfigure preferences;
   a reporting system configured to receive user response and generate reports based on the user response; and
   a data warehouse configured to maintain the preconfigured preferences and reports.

17. The system as recited in claim 10, wherein the optimization engine and the routing system are configured as part of the same computer programmable code.

* * * * *